United States Patent
Kikuma et al.

(10) Patent No.: US 6,999,764 B2
(45) Date of Patent: Feb. 14, 2006

(54) METHOD FOR CHANGING OVER TO DIFFERENT FREQUENCY AT CELLULAR PHONE SYSTEM AND CELLULAR PHONE SYSTEM USING THE METHOD AND BASE STATION CONTROLLING APPARATUS IN THE SYSTEM

(75) Inventors: Tomohiro Kikuma, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 271 days.

(21) Appl. No.: 10/616,909

(22) Filed: Jul. 11, 2003

(65) Prior Publication Data

US 2004/0106407 A1 Jun. 3, 2004

(30) Foreign Application Priority Data

Jul. 15, 2002 (JP) ............................. 2002-205076

(51) Int. Cl.
H04Q 7/20 (2006.01)

(52) U.S. Cl. ................................ 455/436; 455/422.1

(58) Field of Classification Search ................ 455/436, 455/422.1
See application file for complete search history.

(56) References Cited

U.S. PATENT DOCUMENTS

2004/0106407 A1 * 6/2004 Kikuma et al. ............. 455/436

* cited by examiner

Primary Examiner—William D. Cumming
(74) Attorney, Agent, or Firm—Young & Thompson

(57) ABSTRACT

A cellular phone system, in which the probability generating a call drop is lowered and the processing ability in a base station controlling apparatus can be used effectively, is provided. At a cellular phone system, in which a mobile communication terminal can connect to a first base station by using a carrier frequency and can connect to a second base station by using a different carrier frequency, the mobile communication terminal measures reception quality in the carrier frequencies during the communication with the first base station. When the currently using carrier frequency is changed over to the different carrier frequency based on the measured results of the reception quality, a threshold value for changing over to the different carrier frequency is changed corresponding to the traffic in the currently using carrier frequency by the base station controlling apparatus.

24 Claims, 8 Drawing Sheets

METHOD FOR CHANGING OVER TO DIFFERENT FREQUENCY AT CELLULAR PHONE SYSTEM AND CELLULAR PHONE SYSTEM USING THE METHOD AND BASE STATION CONTROLLING APPARATUS IN THE SYSTEM

BACKGROUND OF THE INVENTION

The present invention relates to a method for changing over to a different frequency at a cellular phone system, and a cellular phone system using the method, and a base station controlling apparatus in the system.

Description of the Related Art

At a cellular phone system using a CDMA (code division multiple access) system, in order to keep the channel capacity in the high level, its transmission power is controlled. Generally, the transmission power is controlled by using a value of SIR (signal to interference power ratio) showing in the following equation (1).

$$SIR=S/(I+N) \qquad (1)$$

In this, the S signifies desiring wave signal power, the I signifies interference power per band, and the N signifies noise power per band.

At the control of the transmission power, the reception side measures the reception SIR shown in the equation (1). When the measured result is smaller than a target SIR, the reception side requires the transmission side to increase the transmission power, and when the measured result is larger than the target SIR, the reception side requires the transmission side to decrease the transmission power. With this, its channel quality can be controlled in a certain value and the channel capacity can be kept in the high level.

Further, at the cellular phone system using the CDMA system, in case that plural carrier frequencies are allocated, a technology, which changes over its carrier frequency to a different carrier frequency, is important.

Generally, this technology for changing over to the different frequency is a technology to make the frequency utilization efficiency high, and has a purpose that a call drop phenomenon caused by the deterioration of the channel quality in the currently using carrier frequency is avoided.

First, the technology changing over to a different frequency is explained in the viewpoint of the system structure. In the explanation of prior arts, drawings showing in FIGS. 1 to 3, which are the drawings using at embodiments of the present invention, are used.

In FIG. 1, the structure of a cellular phone system, in which two carrier frequencies are used in one service area, is shown. In FIG. 2, the positions of the carrier frequencies in the upstream channel and the downstream channel are shown.

Base stations 10, 11, 20, and 21, mobile communication terminals 30, 31, and 32, and a base station controlling apparatus 60, which controls the base stations, are shown in FIG. 1.

In FIG. 1, the mobile communication terminal 30 can connect its channel to any of base stations 10, 11, 20, and 21. The carrier frequencies, which the mobile communication terminal 30 uses in the channel with the base stations 10 and 11, is a carrier frequency 101 at the upstream channel, and a carrier frequency 103 at the downstream channel shown in FIG. 2. And the carrier frequencies, which the mobile communication terminal 30 uses in the channel with the base stations 20 and 21, is a carrier frequency 102 at the upstream channel and a carrier frequency 104 at the downstream channel shown in FIG. 2.

And the judgement changing over to the different frequency, whether the mobile communication terminal 30 connects to the base stations 10 and 11 or the base stations 20 and 21 during its communication, is controlled by the base station controlling apparatus 60. And also the base station controlling apparatus 60 executes the control changing over to the different frequency.

In order to control the changing over to the different frequency, the base station controlling apparatus 60 has a function to receive traffic information in each of the carrier frequencies. In this, the control changing over to the different frequency by the base station controlling apparatus 60 is executed to all of the base stations and the mobile communication terminals, which are managed by the base station controlling apparatus 60, under designated conditions.

In FIG. 1, broadcast channels 40 and 41, downstream individual channels 50 and 51, and upstream individual channels 70 and 71 are also shown.

Next, two conventional control methods for changing over to a different frequency are explained.

First, a first conventional control method for changing over to a different frequency is explained. At the first conventional control method for changing over to the different frequency, the control changing over to the different frequency is executed corresponding to the reception quality at the broadcast channels 40 and 41.

In FIG. 1, it is assumed that the channel of the mobile communication terminal 30 has been connected to the base station 10 as the initial state. At this time, at the downstream channel of the mobile communication terminal 30, the currently using carrier frequency is 103, and the different carrier frequency to which the currently using carrier frequency is changed over is 104. And at the upstream channel, the currently using carrier frequency is 101, and the different carrier frequency to which the currently using carrier frequency is changed over is 102.

At this time, the mobile communication terminal 30 measures the reception quality Q_1 in the broadcast channel of the currently using carrier frequency 103 and the reception quality Q_2 in the broadcast channel of the different carrier frequency 104 to which the currently using carrier frequency is changed over, and compares the measured results. And at the time when the difference between the reception quality Q_1 and Q_2 satisfies the following inequality (2), the changing over to the different frequency is executed.

$$Q\_2-Q\_1 > Th\_HO\_\text{Quality [dB]} \qquad (2)$$

The changing over to the different frequency signifies that the carrier frequency using currently is changed over to a different frequency. In this case, at the downstream channel, the carrier frequency is changed over from the carrier frequency 103 to the carrier frequency 104, and at the upstream channel, the carrier frequency is changed over from the carrier frequency 101 to the carrier frequency 102.

At the inequality shown in (2), the Th_HO_Quality signifies a judging threshold value at the control for changing over to a different frequency, and the value of the Th_HO_Quality is positive.

Generally, at the inequality (2), the smaller the value of the Th_HO_Quality is, the smaller the probability generating a call drop becomes. However, the load controlling the changing over to the different frequency is increased when the value of the Th_HO_Quality is set to be small. Therefore, an optimum value is set as the value of the Th_HO_Quality. By the description mentioned above, the first conventional control method for changing over to the different frequency was explained.

Next, a second conventional control method for changing over to a different frequency is explained. At the second conventional control method for changing over to the different frequency, the changing over to the different frequency is controlled corresponding to traffic.

First, in FIG. 1, it is assumed that the channel of the mobile communication terminal 30 has been connected to the base station 10 as the initial state. At this time, at the downstream channel of the mobile communication terminal 30, the currently using carrier frequency is 103, and the different carrier frequency to which the currently using carrier frequency is changed over is 104. And at the upstream channel, the currently using carrier frequency is 101, and the different carrier frequency to which the currently using carrier frequency is changed over is 102. And the base station controlling apparatus 60 measures traffic of the currently using carrier frequencies 101 and 103, and of the different carrier frequencies 102 and 104 to which the currently using carrier frequencies are changed over.

At this second conventional control method for changing over to the different frequency, the upstream channels are studied. When the traffic in the currently using carrier frequency 101 is increased, and the traffic becomes close to the channel capacity limit in the system, the reception quality of the mobile communication terminal whose channel has been connected by using the currently using carrier frequency 101 is deteriorated, and the probability generating a call drop becomes high.

Generally, when the traffic in the currently using carrier frequency exceeded a threshold value, the base station controlling apparatus 60 judges that the traffic in the currently using carrier frequency is high. And the base station controlling apparatus 60 restricts the carrier frequency being high traffic to not connecting new channels, for preventing the deterioration of the channel quality. Further, the base station controlling apparatus 60 makes the transmission rate low for the plural mobile communication terminals using the currently using carrier frequency and also makes the channel capacity giving to the other users low. In this, it is not desirable to make the transmission rate low, because the throughput in each of the mobile communication terminals is made to be low.

In case that the high traffic occurred in the currently using carrier frequency, when it is possible to use other carrier frequency, the currently using carrier frequency is changed over to a carrier frequency in which the traffic is not high by the control changing over to the different frequency. With this, the deterioration of the channel quality can be avoided.

Next, the control changing over to the different frequency corresponding to the traffic is explained.

The base station controlling apparatus 60 observes the traffic in the currently using carrier frequency 101. When the traffic in the currently using carrier frequency exceeded a judging threshold value Th_Load, the base station controlling apparatus 60 instructs the mobile communication terminal 30 to measure the reception quality Q_2 of the broadcast channel of a different carrier frequency to which the currently using carrier frequency is changed over. The mobile communication terminal 30, which received this instruction, measures the reception quality Q_2 of the broadcast channel of the different carrier frequency to which the currently using carrier frequency is changed over. And the mobile communication terminal 30 informs the base station controlling apparatus 60 about the measured result.

The base station controlling apparatus 60, which received the measured result, controls to change over from the currently using carrier frequency to the different carrier frequency, when the measured result of the reception quality Q_2 of the broadcast channel of the different carrier frequency to which the currently using carrier frequency is changed over at the mobile communication terminal 30 satisfied the following inequality (3).

$$Q\_2 > Th\_HO\_Load \quad (3)$$

In this, in the inequality (3), the Th_HO_Load is a judging threshold value. In the inequality (3), the higher the judging threshold value Th_HO_Load becomes, the higher the reception quality Q_2 in the broadcast channel after the carrier frequency was changed over becomes. However, when the judging threshold value Th_HO_Load is made to be high, the probability satisfying the condition in the inequality (3) becomes low, and the probability lowering the transmission rate becomes high. Therefore, the judging threshold value Th_HO_Load is set to be a value that is slightly larger than a level with which the reception quality Q_2 of the broadcast channel becomes a state being possible to communicate. This setting of the value comes from the following reason. That is, the probability executing the control by the low transmission rate is made to be low, within the range that the reception quality Q_2 of the broadcast channel of the different carrier frequency to which the currently using carrier frequency is changed over is in the state being possible to communicate. In this, the measurement of the traffic by the base station controlling apparatus 60 can be executed for the carrier frequency in the downstream channel. By the description mentioned above, the second conventional control method for changing over to the different frequency was explained.

Generally, at the cellular phone system using plural carrier frequencies, the mobile communication terminal in the system uses one oscillator from the viewpoint of low power consumption, and the oscillating frequency of the oscillator is changed, when it is needed. Under this structure of the mobile communication terminal, when the reception quality of the different carrier frequency, to which the currently using carrier frequency is changed over, is measured, there is a following problem due to the one oscillator. That is, the mobile communication terminal cannot receive data from the currently using carrier frequency while the mobile communication terminal is measuring the reception quality of the different carrier frequency to which the currently using carrier frequency is changed over.

Therefore, at the system, it is necessary that its transmitting waveform has been formed, at the state that a data vacant time for measuring the reception quality of the different carrier frequency to which the currently using carrier frequency is changed over is kept beforehand.

In case that the communication speed is a constant, in order to make the data vacant time, a data compression technology, by which the data vacant time is made, is required.

Generally, at the data compression technology, the transmission data are compressed in the time by using a method lowering its diffusion rate or a method making its coding rate higher by that a part of coded data is not transmitted. At the data compression technology, when it is compared with a case in which the data compression technology is not used, the error correction ability at the reception is deteriorated, therefore the frequency utilization efficiency is lowered.

Consequently, it is not desirable that the ratio of the data vacant time to the communication time becomes high. Hereinafter, the ratio of the data vacant time to the communication time is referred to as the ratio of the data vacant time.

By the reason mentioned above, at the time of measuring the different frequency, it is desirable that the timing of changing over to the different frequency is judged accurately in a low ratio of the data vacant time. In order to lower the ratio of the data vacant time, the following improved control method is used for the first conventional control method for changing over to the different frequency mentioned above.

Next, this improved method, in which the range of the measurement of the different frequency is limited, is explained. In FIG. 3, at the downstream channel to the mobile communication terminal 30, the waveform of the reception quality Q_1 of the broadcast channel in the currently using carrier frequency and the waveform of the reception quality Q_2 of the broadcast channel in the different carrier frequency to which the currently using carrier frequency is changed over are shown.

In FIG. 3, in order to decrease the data vacant time at the time when the different frequency (reception quality Q_2) is measured, the mobile communication terminal 30 starts to measure the different frequency (reception quality Q_2) at the time t1 or t3, when the reception quality Q_1 of the broadcast channel in the currently using carrier frequency satisfied the following inequality (4).

$$Q\_1 < Th\_Start \quad (4)$$

After this, the mobile communication terminal 30 ends the measurement of the different frequency at the time t2, when the reception quality Q_1 of the broadcast channel in the currently using carrier frequency satisfied the following inequality (5). Or the mobile communication terminal 30 ends the measurement of the different frequency at the time t4, when the inequality (2) was satisfied, at the same time the control of the changing over to the different frequency is started.

$$Q\_1 > Th\_End \quad (5)$$

In this case, the judging threshold values Th_Start and Th_End in the inequalities (4) and (5) are desirable to have a margin satisfying the following inequality (6).

$$Th\_End - Th\_Start > 0 \quad (6)$$

In the inequality (6), the larger the difference between the Th_End and Th_Start is, the larger the margin becomes. Generally, when the margin becomes large, the number of times of start and end of the measurement of the different frequency is decreased, and there is an advantage that the controlling load at the base station controlling apparatus 60 is decreased. However, since the number of times of the end of the measurement of the different frequency is decreased, the ratio of the data vacant time is increased, and the channel capacity is decreased. Therefore, the margin at the inequality (6) must be an optimum value.

By the concept mentioned above, the range of measuring the different frequency is limited by using the judging threshold values Th_Start and Th_End. With this, when it is compared with that the range of measuring the different frequency is not limited, the ratio of the data vacant time can be decreased.

As mentioned above, at the conventional methods for changing over to the different frequency, all of the base stations and all of the mobile communication terminals, which are managed by the base station controlling apparatus, are controlled under designated conditions. That is, each of the judging threshold values is a constant. Therefore, regardless of the high or low traffic in each of the carrier frequencies, the same control of changing over to the different frequency is applied. Consequently, when the traffic in a carrier frequency becomes high, the high traffic in the carrier frequency becomes close to the maximum limit of the channel capacity, and the probability generating a call drop becomes high. However, the probability changing over to the different frequency does not increase.

On the other hand, when the traffic in the carrier frequency becomes low, the margin in the channel capacity becomes large, and the probability generating the call drop becomes low. However, since the probability changing over to the different frequency does not decrease, the load for the base station controlling apparatus does not decrease, and the throughput at the base station controlling apparatus becomes low.

Moreover, at the conventional methods for changing over to the different frequency, all of the base stations and all of the mobile communication terminals, which are managed by the base station controlling apparatus, are controlled under designated conditions. That is, each of the judging threshold values is a constant. Therefore, regardless of that the transmission rate in each of the mobile communication terminals is high or low, the same control of changing over to the different frequency is applied. Consequently, when the transmission rate in each of the mobile communication terminals becomes high, its using capacity becomes close to the maximum limit of the channel capacity, and the probability generating the call drop becomes high. However, the probability changing over to the different frequency does not increase.

And when the transmission rate in each of the mobile communication terminals becomes low, the margin in the channel capacity becomes large, and the probability generating the call drop becomes low. However, since the probability changing over to the different frequency does not decrease, the load for the base station controlling apparatus does not decrease, and the throughput at the base station controlling apparatus becomes low.

Consequently, at the conventional technologies, there is a problem that it is difficult to utilize the processing ability of the base station controlling apparatus effectively with lowering the probability generating the call drop.

SUMMARY OF THE INVENTION

It is therefore an object of the present invention to provide a method for changing over to a different frequency at a cellular phone system, and a cellular phone system using the method, and a base station controlling apparatus in the system, in particular, in which lowering the probability generating a call drop and efficiently utilizing the processing ability of the base station controlling apparatus can be realized.

According to a first aspect of the present invention, for achieving the object mentioned above, there is provided a method for changing over to a different frequency at a cellular phone system, in which a mobile communication terminal, a first base station and a second base station, and a base station controlling apparatus are provided. And the first base station communicates with the mobile communication terminal by setting a channel using a first frequency, and the second base station communicates with the mobile communication terminal by setting a channel using a second frequency. And the mobile communication terminal is controlled to measure first reception quality in the first frequency during the communication with the first base station by setting a channel, and also the mobile communication terminal is controlled to measure second reception quality in the second frequency corresponding to the first reception quality during the communication with the first base station by setting the channel. And the mobile communication terminal is controlled to communicate with the second base station by changing over the channel from the first base station to the second base station corresponding to the first and second reception quality. And the method for changing over to a different frequency provides the step of, changing the condition of measuring the second reception quality corresponding to the traffic in the first frequency by the base station controlling apparatus.

According to a second aspect of the present invention, in the first aspect, the method for changing over to a different frequency further provides the steps of, changing first and second threshold values corresponding to the traffic in the first frequency by the base station controlling apparatus, and instructing the mobile communication terminal to measure the second reception quality by the base station controlling apparatus when the first reception quality is less than the first threshold value.

According to a third aspect of the present invention, there is provided a method for changing over to a different frequency at a cellular phone system, in which a mobile communication terminal, a first base station and a second base station, and a base station controlling apparatus are provided. And the first base station communicates with the mobile communication terminal by setting a channel using a first frequency, and the second base station communicates with the mobile communication terminal by setting a channel using a second frequency. And the mobile communication terminal is controlled to measure first reception quality in the first frequency and second reception quality in the second frequency during the communication with the first base station by setting a channel. And the mobile communication terminal is controlled to communicate with the second base station by changing over the channel from the first base station to the second base station when the difference between the second reception quality and the first reception quality exceeded a third threshold value. And the method for changing over to a different frequency provides the steps of, measuring the traffic in the first frequency by the base station controlling apparatus, and changing the third threshold value corresponding to the measured traffic by the base station controlling apparatus.

According to a fourth aspect of the present invention, in the first, or third aspect, the method for changing over to a different frequency further provides the step of, controlling the mobile communication terminal not to measure the second reception quality by the base station controlling apparatus in case that the traffic is less than a specific value.

According to a fifth aspect of the present invention, there is provided a method for changing over to a different frequency at a cellular phone system, in which a mobile communication terminal, a first base station and a second base station, and a base station controlling apparatus are provided. And the first base station communicates with the mobile communication terminal by setting a channel using a first frequency, and the second base station communicates with the mobile communication terminal by setting a channel using a second frequency. And the mobile communication terminal is controlled to measure second reception quality in the second frequency during the communication with the first base station by setting a channel. And the mobile communication terminal is controlled to communicate with the second base station by changing over the channel from the first base station to the second base station when the second reception quality exceeded a fourth threshold value. And the method for changing over to a different frequency provides the steps of, measuring the traffic in the first frequency by the base station controlling apparatus, and changing the fourth threshold value corresponding to the measured traffic by the base station controlling apparatus.

According to a sixth aspect of the present invention, in the fifth aspect, the method for changing over to a different frequency further provides the step of, controlling the mobile communication terminal to communicate with the second base station by changing over the channel from the first base station to the second base station in case that the measured traffic exceeded a designated threshold value by the base station controlling apparatus.

According to a seventh aspect of the present invention, there is provided a method for changing over to a different frequency at a cellular phone system, in which a mobile communication terminal, a first base station and a second base station, and a base station controlling apparatus are provided. And the first base station communicates with the mobile communication terminal by setting a channel using a first frequency, and the second base station communicates with the mobile communication terminal by setting a channel using a second frequency. And the mobile communication terminal is controlled to measure first reception quality in the first frequency during the communication with the first base station by setting a channel, and also the mobile communication terminal is controlled to measure second reception quality in the second frequency corresponding to the first reception quality during the communication with the first base station by setting the channel. And the mobile communication terminal is controlled to communicate with the second base station by changing over the channel from the first base station to the second base station corresponding to the first and second reception quality. And the method for changing over to a different frequency provides the step of, changing the condition of measuring the second reception quality corresponding to the transmission rate in the mobile communication terminal by the base station controlling apparatus.

According to an eighth aspect of the present invention, in the seventh aspect, the method for changing over to a different frequency further provides the steps of, changing first and second threshold values corresponding to the transmission rate in the mobile communication terminal by the base station controlling apparatus, and instructing the mobile communication terminal to measure the second reception quality by the base station controlling apparatus, when the first reception quality is less than the first threshold value.

According to a ninth aspect of the present invention, there is provided a method for changing over to a different frequency at a cellular phone system, in which a mobile communication terminal, a first base station and a second base station, and a base station controlling apparatus are provided. And the first base station communicates with the mobile communication terminal by setting a channel using a first frequency, and the second base station communicates with the mobile communication terminal by setting a channel using a second frequency. And the mobile communication terminal is controlled to measure first reception quality in the first frequency and second reception quality in the second frequency during the communication with the first base station by setting a channel. And the mobile communication terminal is controlled to communicate with the second base station by changing over the channel from the first base station to the second base station when the difference between the second reception quality and the first reception quality exceeded a third threshold value. And the method for changing over to a different frequency provides the step of, changing the third threshold value corresponding to the transmission rate in the mobile communication terminal by the base station controlling apparatus.

According to a tenth aspect of the present invention, there is provided a method for changing over to a different frequency at a cellular phone system, in which a mobile communication terminal, a first base station and a second base station, and a base station controlling apparatus are provided. And the first base station communicates with the mobile communication terminal by setting a channel using a first frequency, and the second base station communicates with the mobile communication terminal by setting a channel using a second frequency. And the mobile communication terminal is controlled to measure second reception quality in the second frequency during the communication with the first base station by setting a channel. And the mobile communication terminal is controlled to communicate with the second base station by changing over the channel from the first base station to the second base station when the second reception quality exceeded a fourth threshold value. And the method for changing over to a different frequency provides the step of, changing the fourth threshold value corresponding to the transmission rate in the mobile communication terminal by the base station controlling apparatus.

According to an eleventh aspect of the present invention, in the first, third, fifth, seventh, ninth, or tenth aspect, the first base station transmits a first broadcast channel and the second base station transmits a second broadcast channel, and the first reception quality is reception quality in the first broadcast channel and the second reception quality is reception quality in the second broadcast channel.

According to a twelfth aspect of the present invention, in the first, third, fifth, seventh, ninth, or tenth aspect, the method for changing over to a different frequency further provides the steps of, making a data vacant time in which data are not transmitted by compressing transmitting data in the time by the first base station, and measuring the second reception quality in the data vacant time by the mobile communication terminal.

According to a thirteenth aspect of the present invention, for achieving the object mentioned above, there is provided a cellular phone system, in which a mobile communication terminal, a first base station and a second base station, and a base station controlling apparatus are provided. And the first base station communicates with the mobile communication terminal by setting a channel using a first frequency, and the second base station communicates with the mobile communication terminal by setting a channel using a second frequency. And the mobile communication terminal is controlled to measure first reception quality in the first frequency during the communication with the first base station by setting a channel, and also the mobile communication terminal is controlled to measure second reception quality in the second frequency corresponding to the first reception quality during the communication with the first base station by setting the channel. And the mobile communication terminal is controlled to communicate with the second base station by changing over the channel from the first base station to the second base station corresponding to the first and second reception quality. And the base station controlling apparatus provides a condition changing means for changing the condition of measuring the second reception quality corresponding to the traffic in the first frequency.

According to a fourteenth aspect of the present invention, in the thirteenth aspect, the base station controlling apparatus further provides a first threshold value changing means for changing first and second threshold values corresponding to the traffic in the first frequency, and an instructing means for instructing the mobile communication terminal to measure the second reception quality, when the first reception quality is less than the first threshold value.

According to a fifteenth aspect of the present invention, there is provided a cellular phone system, in which a mobile communication terminal, a first base station and a second base station, and a base station controlling apparatus are provided. And the first base station communicates with the mobile communication terminal by setting a channel using a first frequency, and the second base station communicates with the mobile communication terminal by setting a channel using a second frequency. And the mobile communication terminal is controlled to measure first reception quality in the first frequency and second reception quality in the second frequency during the communication with the first base station by setting a channel. And the mobile communication terminal is controlled to communicate with the second base station by changing over the channel from the first base station to the second base station when the difference between the second reception quality and the first reception quality exceeded a third threshold value. And the base station controlling apparatus provides a traffic measuring means for measuring the traffic in the first frequency, and a second threshold value changing means for changing the third threshold value corresponding to the measured traffic.

According to a sixteenth aspect of the present invention, in the thirteenth, or fifteenth aspect, the base station controlling apparatus further provides a first controlling means for controlling the mobile communication terminal not to measure the second reception quality in case that the traffic is less than a specific value.

According to a seventeenth aspect, there is provided a cellular phone system, in which a mobile communication terminal, a first base station and a second base station, and a base station controlling apparatus are provided. And the first base station communicates with the mobile communication terminal by setting a channel using a first frequency, and the second base station communicates with the mobile communication terminal by setting a channel using a second frequency. And the mobile communication terminal is controlled to measure second reception quality in the second frequency during the communication with the first base station by setting a channel. And the mobile communication terminal is controlled to communicate with the second base station by changing over the channel from the first base station to the second base station when the second reception quality exceeded a fourth threshold value. And the base station controlling apparatus provides a traffic measuring means for measuring the traffic in the first frequency, and a third threshold value changing means for changing the fourth threshold value corresponding to the measured traffic.

According to an eighteenth aspect of the present invention, in the seventeenth aspect, the base station controlling apparatus further provides a second controlling means for controlling the mobile communication terminal to communicate with the second base station by changing over the channel from the first base station to the second base station in case that the measured traffic exceeded a designated threshold value.

According to a nineteenth aspect of the present invention, there is provided a cellular phone system, in which a mobile communication terminal, a first base station and a second base station, and a base station controlling apparatus are provided. And the first base station communicates with the mobile communication terminal by setting a channel using a first frequency, and the second base station communicates with the mobile communication terminal by setting a channel using a second frequency. And the mobile communication terminal is controlled to measure first reception quality in the first frequency during the communication with the first base station by setting a channel, and also the mobile communication terminal is controlled to measure second reception quality in the second frequency corresponding to the first reception quality during the communication with the first base station by setting the channel. And the mobile communication terminal is controlled to communicate with the second base station by changing over the channel from the first base station to the second base station corresponding to the first and second reception quality. And the base station controlling apparatus provides a condition changing means for changing the condition of measuring the second reception quality corresponding to the transmission rate in the mobile communication terminal.

According to a twentieth aspect of the present invention, in the nineteenth aspect, the base station controlling apparatus further provides a first threshold value changing means for changing first and second threshold values corresponding to the transmission rate in the mobile communication terminal, and an instructing means for instructing the mobile communication terminal to measure the second reception quality, when the first reception quality is less than the first threshold value.

According to a twenty-first aspect of the present invention, there is provided a cellular phone system, in which a mobile communication terminal, a first base station and a second base station, and a base station controlling apparatus are provided. And the first base station communicates with the mobile communication terminal by setting a channel using a first frequency, and the second base station communicates with the mobile communication terminal by setting a channel using a second frequency. And the mobile communication terminal is controlled to measure first reception quality in the first frequency and second reception quality in the second frequency during the communication with the first base station by setting a channel. And the mobile communication terminal is controlled to communicate with the second base station by changing over the channel from the first base station to the second base station when the difference between the second reception quality and the first reception quality exceeded a third threshold value. And the base station controlling apparatus provides a second threshold value changing means for changing the third threshold value corresponding to the transmission rate in the mobile communication terminal.

According to a twenty-second aspect of the present invention, there is provided a cellular phone system, in which a mobile communication terminal, a first base station and a second base station, and a base station controlling apparatus are provided. And the first base station communicates with the mobile communication terminal by setting a channel using a first frequency, and the second base station communicates with the mobile communication terminal by setting a channel using a second frequency. And the mobile communication terminal is controlled to measure second reception quality in the second frequency during the communication with the first base station by setting a channel. And the mobile communication terminal is controlled to communicate with the second base station by changing over the channel from the first base station to the second base station when the second reception quality exceeded a fourth threshold value. And the base station controlling apparatus provides a third threshold value changing means for changing the fourth threshold value corresponding to the transmission rate in the mobile communication terminal.

According to a twenty-third aspect of the present invention, in the thirteenth, fifteenth, seventeenth, nineteenth, twenty-first, or twenty-second aspect, the first base station transmits a first broadcast channel and the second base station transmits a second broadcast channel, and the first reception quality is reception quality in the first broadcast channel and the second reception quality is reception quality in the second broadcast channel.

According to a twenty-fourth aspect of the present invention, in the thirteenth, fifteenth, seventeenth, nineteenth, twenty-first, or twenty-second aspect, the first base station provides a data vacant time making means for making a data vacant time in which data are not transmitted by compressing transmitting data in the time, and the mobile communication terminal provides a measuring means for measuring the second reception quality in the data vacant time.

According to a twenty-fifth aspect of the present invention, for achieving the object mentioned above, there is provided a base station controlling apparatus in a cellular phone system, in which a mobile communication terminal, a first base station and a second base station, and the base station controlling apparatus are provided. And the first base station communicates with the mobile communication terminal by setting a channel using a first frequency, and the second base station communicates with the mobile communication terminal by setting a channel using a second frequency. And the mobile communication terminal is controlled to measure first reception quality in the first frequency during the communication with the first base station by setting a channel, and also the mobile communication terminal is controlled to measure second reception quality in the second frequency corresponding to the first reception quality during the communication with the first base station by setting the channel. And the mobile communication terminal is controlled to communicate with the second base station by changing over the channel from the first base station to the second base station corresponding to the first and second reception quality. And the base station controlling apparatus provides a condition changing means for changing the condition of measuring the second reception quality corresponding to the traffic in the first frequency.

According to a twenty-sixth aspect of the present invention, in the twenty-fifth aspect, the base station controlling apparatus further provides a first threshold value changing means for changing first and second threshold values corresponding to the traffic in the first frequency, and an instructing means for instructing the mobile communication terminal to measure the second reception quality when the first reception quality is less than the first threshold value.

According to a twenty-seventh aspect of the present invention, there is provided a base station controlling apparatus in a cellular phone system, in which a mobile communication terminal, a first base station and a second base station, and the base station controlling apparatus are provided. And the first base station communicates with the mobile communication terminal by setting a channel using a first frequency, and the second base station communicates with the mobile communication terminal by setting a channel using a second frequency. And the mobile communication terminal is controlled to measure first reception quality in the first frequency and second reception quality in the second frequency during the communication with the first base station by setting a channel. And the mobile communication terminal is controlled to communicate with the second base station by changing over the channel from the first base station to the second base station when the difference between the second reception quality and the first reception quality exceeded a third threshold value. And the base station controlling apparatus provides a traffic measuring means for measuring the traffic in the first frequency, and a second threshold value changing means for changing the third threshold value corresponding to the measured traffic.

According to a twenty-eighth aspect of the present invention, in the twenty-fifth, or twenty-seventh aspect, the base station controlling apparatus further provides a first controlling means for controlling the mobile communication terminal not to measure the second reception quality in case that the traffic is less than a specific value.

According to a twenty-ninth aspect of the present invention, there is provided a base station controlling apparatus in a cellular phone system, in which a mobile communication terminal, a first base station and a second base station, and the base station controlling apparatus are provided. And the first base station communicates with the mobile communication terminal by setting a channel using a first frequency, and the second base station communicates with the mobile communication terminal by setting a channel using a second frequency. And the mobile communication terminal is controlled to measure second reception quality in the second frequency during the communication with the first base station by setting a channel. And the mobile communication terminal is controlled to communicate with the second base station by changing over the channel from the first base station to the second base station when the second reception quality exceeded a fourth threshold value. And the base station controlling apparatus provides a traffic measuring means for measuring the traffic in the first frequency, and a third threshold value changing means for changing the fourth threshold value corresponding to the measured traffic.

According to a thirtieth aspect of the present invention, in the twenty-ninth aspect, the base station controlling apparatus further provides a second controlling means for controlling the mobile communication terminal to communicate with the second base station by changing over the channel from the first base station to the second base station in case that the measured traffic exceeded a designated threshold value.

According to a thirty-first aspect of the present invention, there is provided a base station controlling apparatus in a cellular phone system, in which a mobile communication terminal, a first base station and a second base station, and the base station controlling apparatus are provided. And the first base station communicates with the mobile communication terminal by setting a channel using a first frequency, and the second base station communicates with the mobile communication terminal by setting a channel using a second frequency. And the mobile communication terminal is controlled to measure first reception quality in the first frequency during the communication with the first base station by setting a channel, and also the mobile communication terminal is controlled to measure second reception quality in the second frequency corresponding to the first reception quality during the communication with the first base station by setting the channel. And the mobile communication terminal is controlled to communicate with the second base station by changing over the channel from the first base station to the second base station corresponding to the first and second reception quality. And the base station controlling apparatus provides a condition changing means for changing the condition of measuring the second reception quality corresponding to the transmission rate in the mobile communication terminal.

According to a thirty-second aspect of the present invention, in the thirty-first aspect, the base station controlling apparatus further provides a first threshold value changing means for changing first and second threshold values corresponding to the transmission rate in the mobile communication terminal, and an instructing means for instructing the mobile communication terminal to measure the second reception quality, when the first reception quality is less than the first threshold value.

According to a thirty-third aspect of the present invention, there is provided a base station controlling apparatus in a cellular phone system, in which a mobile communication terminal, a first base station and a second base station, and the base station controlling apparatus are provided. And the first base station communicates with the mobile communication terminal by setting a channel using a first frequency, and the second base station communicates with the mobile communication terminal by setting a channel using a second frequency. And the mobile communication terminal is controlled to measure first reception quality in the first frequency and second reception quality in the second frequency during the communication with the first base station by setting a channel. And the mobile communication terminal is controlled to communicate with the second base station by changing over the channel from the first base station to the second base station when the difference between the second reception quality and the first reception quality exceeded a third threshold value. And the base station controlling apparatus provides a second threshold value changing means for changing the third threshold value corresponding to the transmission rate in the mobile communication terminal.

According to a thirty-fourth aspect of the present invention, there is provided a base station controlling apparatus in a cellular phone system, in which a mobile communication terminal, a first base station and a second base station, and the base station controlling apparatus are provided. And the first base station communicates with the mobile communication terminal by setting a channel using a first frequency, and the second base station communicates with the mobile communication terminal by setting a channel using a second frequency. And the mobile communication terminal is controlled to measure second reception quality in the second frequency during the communication with the first base station by setting a channel. And the mobile communication terminal is controlled to communicate with the second base station by changing over the channel from the first base station to the second base station when the second reception quality exceeded a fourth threshold value. And the base station controlling apparatus provides a third threshold value changing means for changing the fourth threshold value corresponding to the transmission rate in the mobile communication terminal.

According to a thirty-fifth aspect of the present invention, in the twenty-fifth, twenty-seventh, twenty-ninth, thirty-first, thirty-second, or thirty-fourth aspect, the first base station transmits a first broadcast channel and the second base station transmits a second broadcast channel, and the first reception quality is reception quality in the first broadcast channel and the second reception quality is reception quality in the second broadcast channel.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
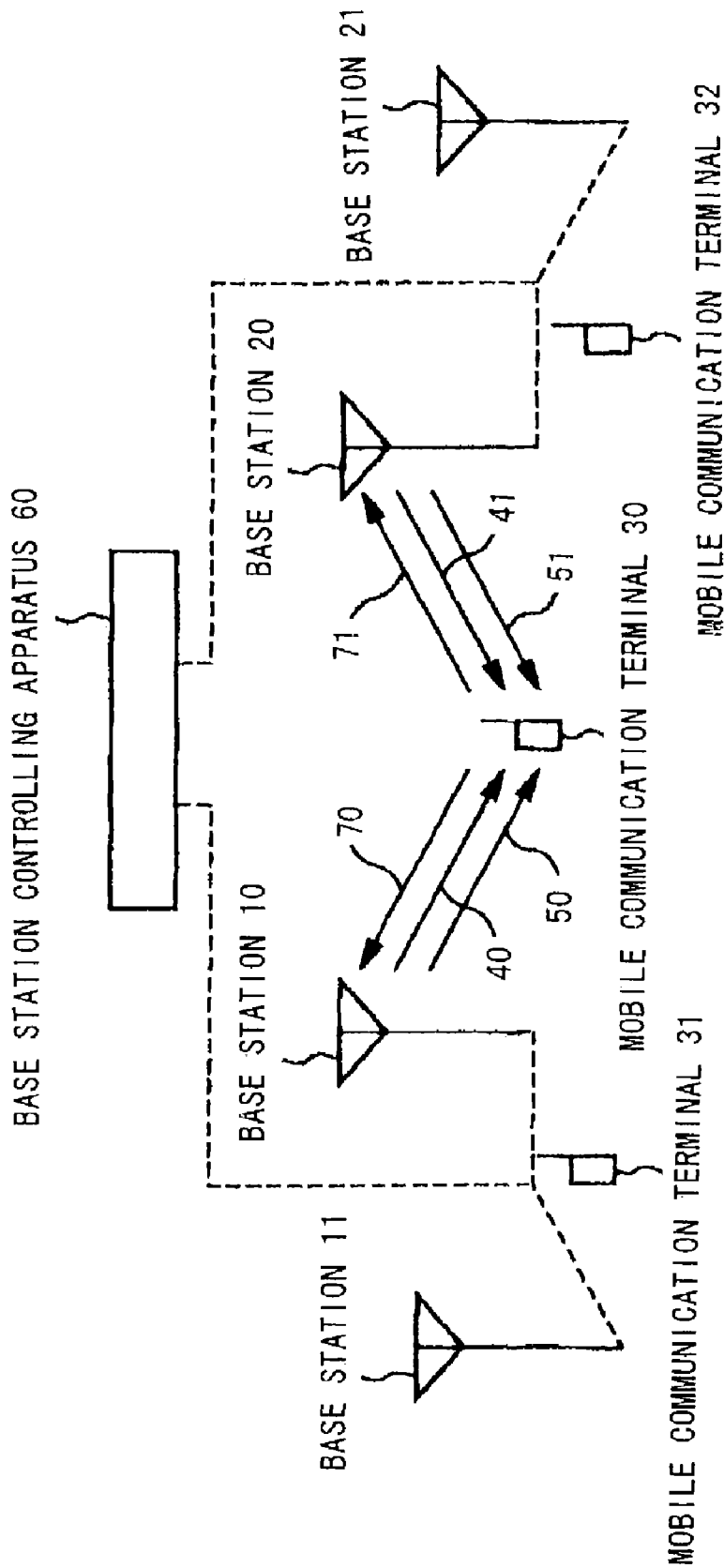
FIG. 1 is a block diagram showing the structure of a cellular phone system using a CDMA system at embodiments of the present invention.
Figure 2:
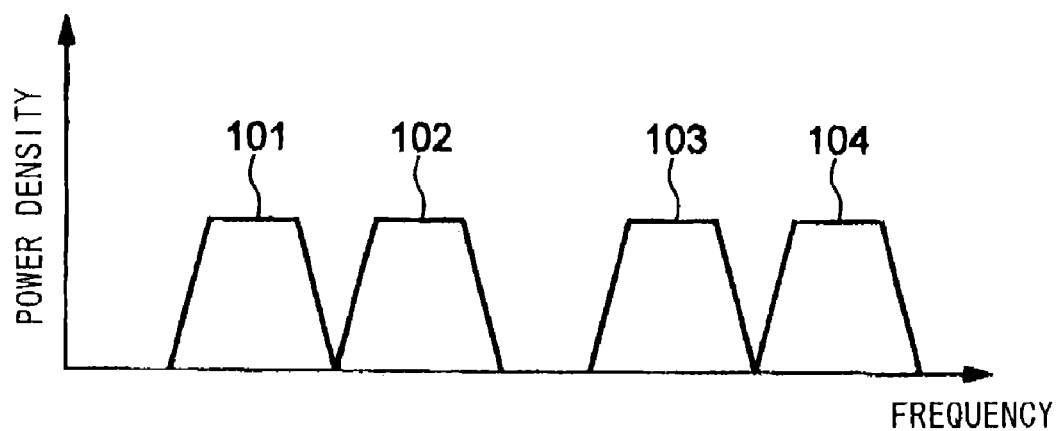
FIG. 2 is a graph showing the positions of carrier frequencies in an upstream channel and a downstream channel at the embodiments of the present invention.
Figure 3:
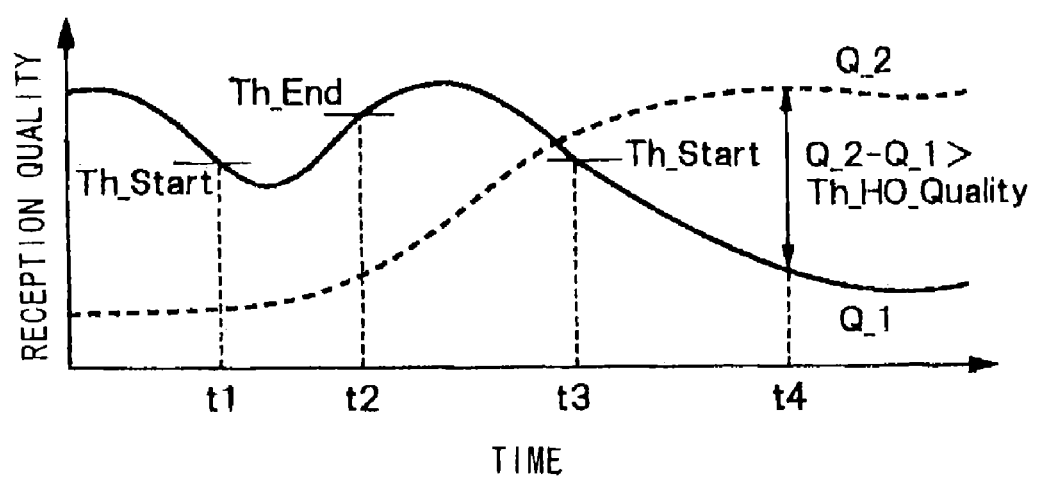
FIG. 3 is a graph showing waveforms of the reception quality Q_1 in a currently using carrier frequency and the reception quality Q_2 in a different carrier frequency to which the currently using carrier frequency is changed in the passage of time at the embodiments of the present invention.

Referring now to the drawings, embodiments of the present invention are explained in detail. In the explanation of the embodiments of the present invention, the drawings used at the explanation of the conventional technologies are also used. That is, FIGS. 1 to 3 are used at the explanation of the embodiments of the present invention. Further, in the explanation of the embodiments of the present invention, the communication between a mobile communication terminal and a base station controlling apparatus is executed via a base station. Therefore, for example, in case that an expression, which a mobile communication terminal transmits information to a base station controlling apparatus, exists, this signifies that the information is actually transmitted from the mobile communication terminal to the base station controlling apparatus via the base station.

FIG. 1 is a block diagram showing the structure of a cellular phone system using a CDMA system at embodiments of the present invention. FIG. 2 is a graph showing the positions of carrier frequencies in an upstream channel and a downstream channel at the embodiments of the present invention. FIG. 3 is a graph showing waveforms of the reception quality Q_1 in a currently using carrier frequency and the reception quality Q_2 in a different carrier frequency to which the currently using carrier frequency is changed in the passage of time at the embodiments of the present invention.

In FIG. 1, a case, in which the cellular phone system uses two carrier frequencies in one service area, is shown.

In FIG. 1, a mobile communication terminal 30 can connect its channel to any of base stations 10, 11, 20, and 21. Further, in FIG. 1, mobile communication terminals 31 and 32, a base station controlling apparatus 60 are shown. In FIG. 1, the number of the mobile communication terminals is three, however, this number is not limited to three, and the number of the base stations is four, however, this number in not limited to four.

In FIG. 2, the carrier frequencies, which the mobile communication terminal 30 uses in the channel with the base stations 10 and 11, are a carrier frequency 101 at the upstream channel and a carrier frequency 103 at the downstream channel. And the carrier frequencies, which the mobile communication terminal 30 uses in the channel with the base stations 20 and 21, is a carrier frequency 102 at the upstream channel and a carrier frequency 104 at the downstream channel.

The base station controlling apparatus 60 judges whether the mobile communication terminal 30 connects to the base station 10 or 11, or the base station 20 or 21 during the communication of the mobile communication terminal 30. And also the base station controlling apparatus 60 controls the changing over to a different frequency. The base station controlling apparatus 60 has a function for measuring traffic in each of the carrier frequencies. And when a new mobile communication terminal desires to connect a base station, the base station controlling apparatus 60 controls the connection of the new mobile communication terminal to the base station, based on the measured result of the traffic. And also in order to decrease the traffic, the base station controlling apparatus 60 controls to decrease the transmission rate in the mobile communication terminal that has been connected to the base station, based on the measured traffic. In this, transmission power control has been applied to the upstream channel and the downstream channel.

The measurement of the different frequency at the mobile communication terminal 30 is executed by utilizing the data vacant time. The data vacant time is made by the data compression technology. At the data compression technology, the transmission data at the downstream channel are compressed in the time by using a method lowering its diffusion rate or a method making its coding rate higher by that a part of coded data is not transmitted, and the data vacant time is made.

Figure 4:
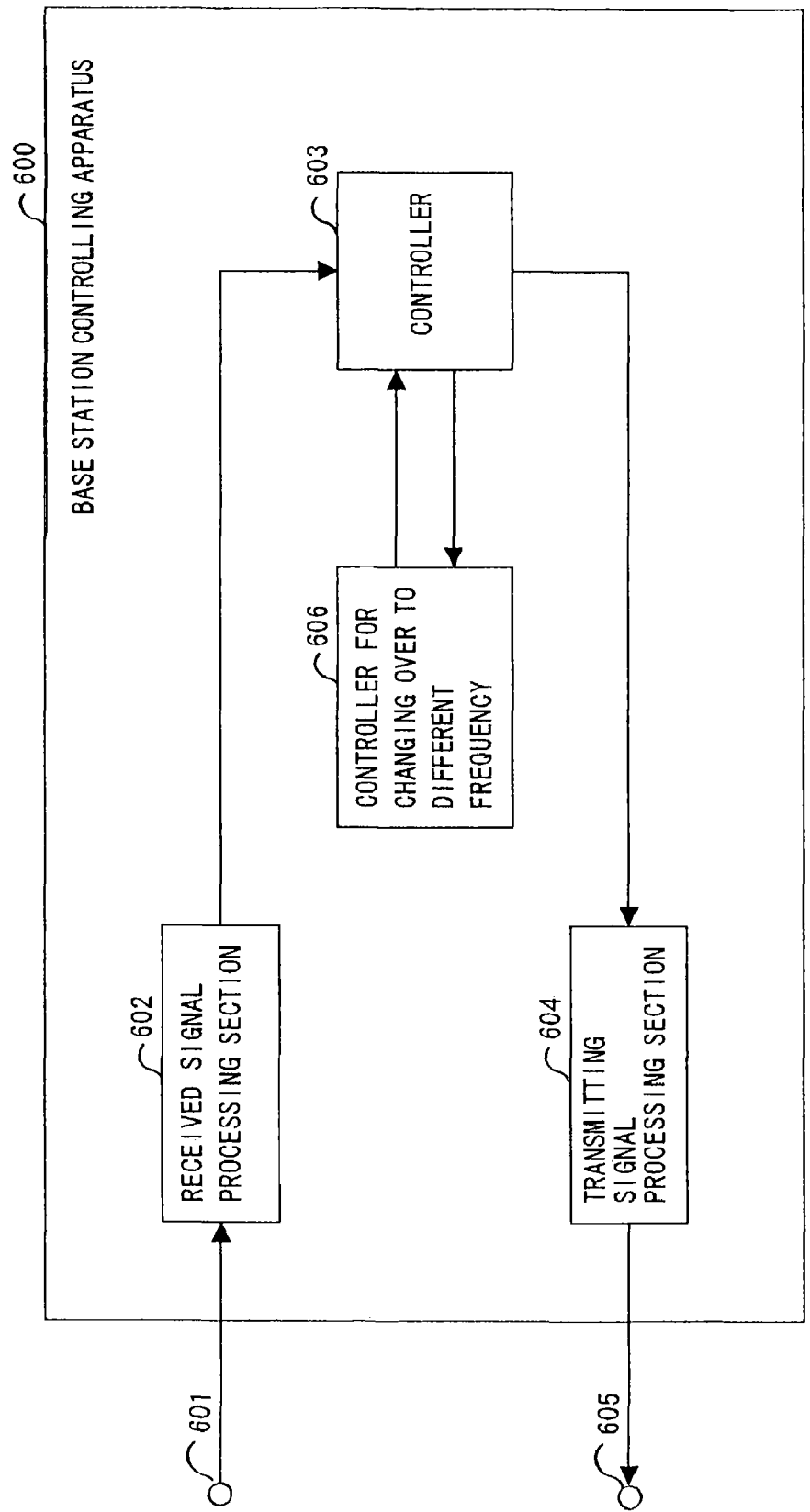
FIG. 4 is a block diagram showing the structure of a base station controlling apparatus at a first embodiment of the present invention.

FIG. 4 is a block diagram showing the structure of a base station controlling apparatus at a first embodiment of the present invention. Referring to FIG. 4, the base station controlling apparatus at the first embodiment of the present invention is explained.

As shown in FIG. 4, a base station controlling apparatus 600 provides an input terminal 601, a received signal processing section 602, a controller 603, a transmitting signal processing section 604, an output terminal 605, and a controller for changing over to different frequency 606. In FIG. 4, the new reference number 600 is attached to the base station controlling apparatus, instead of the reference number 60 in FIG. 1, however the functions of the base station controlling apparatus are the same in FIGS. 1 and 4.

At the input terminal 601, signals from one or plural base stations are received. The received signal processing section 602 processes the signals received at the input terminal 601. The controller 603 executes control based on signals from the base stations and the mobile communication terminals, in this, as mentioned before, the signals from the mobile communication terminals are received via the base stations.

The transmitting signal processing section 604 processes transmitting signals. From the output terminal 605, the signals processed at the transmitting signal processing section 604 are transmitted to one or plural base stations. The controller for changing over to different frequency 606 judges whether the measurement of the different frequency is executed or not and controls the changing over to the different frequency.

The controller 603 is explained in more detail. The controller 603 executes control of channel setting between a base station and a mobile communication terminal, and also measures the transmission rate in the mobile communication terminal, further, measures the traffic in the carrier frequency. And in order to avoid the deterioration of the channel quality caused by high traffic, when a new mobile communication terminal desires to connect its channel to a base station, the controller 603 executes connection restricting control for the new mobile communication terminal when the traffic is high. Further, in this case, the controller 603 executes control for decreasing the transmission rate in the mobile communication terminal, which has been already connected to the base station. In this, the connection restricting control signifies that the controller 603 restricts the new mobile communication terminal to not connecting to the base station when the traffic is high.

The controller for changing over to different frequency 606 is explained in more detail. The controller for changing over to different frequency 606 receives a control signal being a request of changing over to the different frequency from the mobile communication terminal, and transmits control signals for making the data vacant time of the individual channel and for controlling the changing over to the different frequency to the base station connecting to the mobile communication terminal.

Moreover, the controller for changing over to the different frequency 606 receives the information of the reception quality in the carrier frequencies to the mobile communication terminal from the controller 603, and judges whether the changing over to the different frequency is executed or not based on the received information. Further, the controller for changing over to the different frequency 606 judges whether the changing over to the different frequency is executed or not by receiving the information of the transmission power of the base station, and also by the information of the traffic in the carrier frequency measured at the controller 603. And also the controller for changing over to the different frequency 606 judges whether the changing over to the different frequency is executed or not by receiving the information of the transmission rate in the mobile communication terminal measured at the controller 603.

Figure 5:
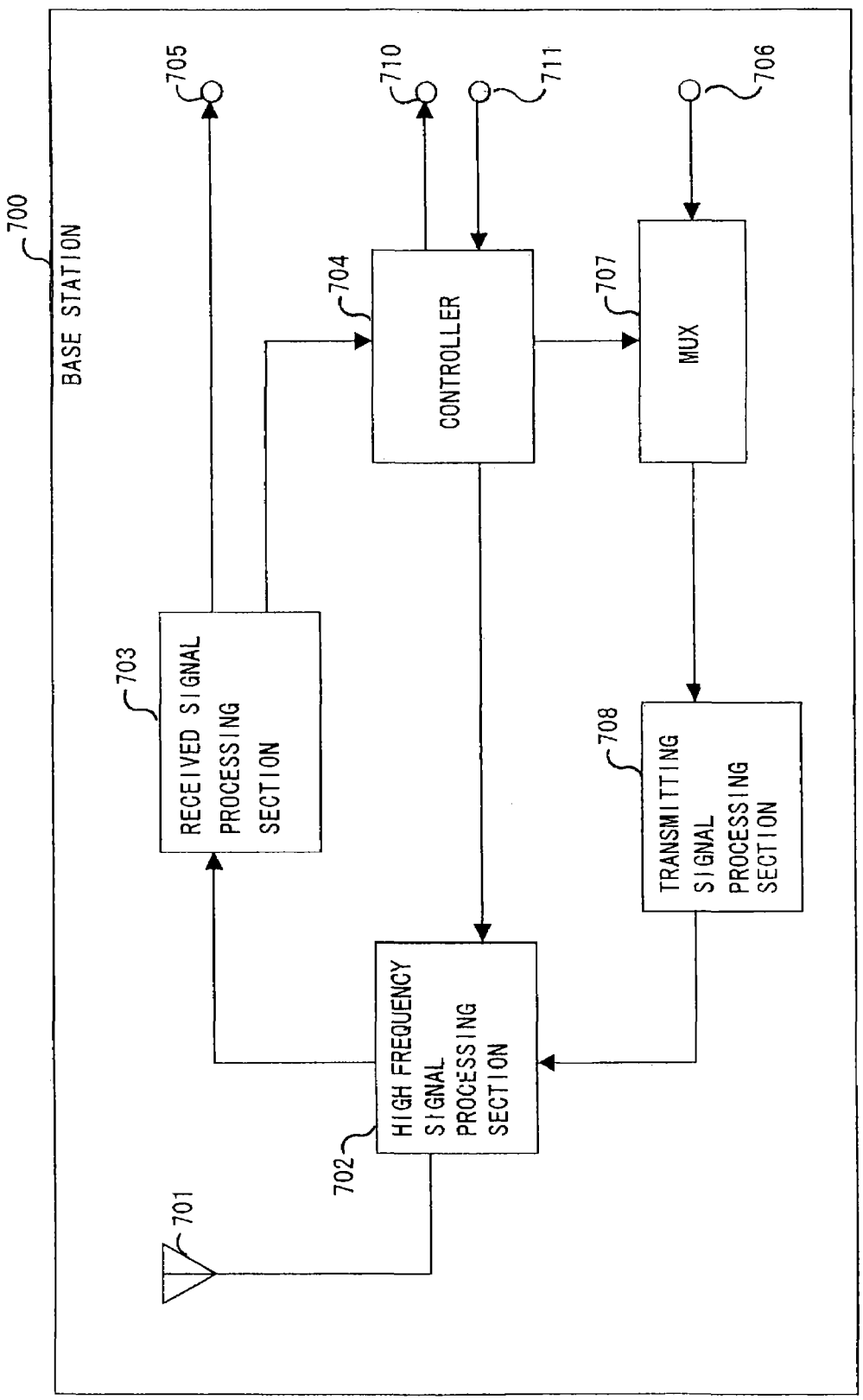
FIG. 5 is a block diagram showing the structure of a base station at the first embodiment of the present invention.

FIG. 5 is a block diagram showing the structure of a base station at the first embodiment of the present invention. Referring to FIG. 5, the base station at the first embodiment of the present invention is explained.

As shown in FIG. 5, a base station 700 provides an antenna 701, a high frequency signal processing section 702, a received signal processing section 703, a controller 704, a first output terminal 705, a first input terminal 706, an MUX (multiplexer) 707, a transmitting signal processing section 708, a second output terminal 710, and a second input terminal 711. In FIG. 5, the new reference number 700 is attached to the base station, instead of the reference number 10, 11, 20, or 21 in FIG. 1, however the functions of the base station are the same in FIGS. 1 and 5.

At the antenna 701, signals from one or plural mobile communication terminals are received, and also from the antenna 701, signals are transmitted to the one or plural mobile communication terminals. The high frequency signal processing section 702 processes received high frequency signals and transmitting high frequency signals. The received signal processing section 703 processes received signals. From the first output terminal 705, received signals processed at the received signal processing section 703 are outputted. From the first input terminal 706, transmitting data are inputted. The controller 704 executes control by using information inputted from the second input terminal 711 that receives control signals transmitted from the base station controlling apparatus 600 shown in FIG. 4. And also the controller 704 transmits control information to the base station controlling apparatus 600 via the second output terminal 710. The MUX 707 multiplexes the transmitting data inputted from the first input terminal 706 and control signals from the controller 704. The transmitting signal processing section 708 processes the data multiplexed at the MUX 707.

The high frequency signal processing section 702 is explained in more detail. The high frequency signal processing section 702 changes over the carrier frequency using at transmission or reception by receiving a control signal changing over to the different frequency from the controller 704. This control signal is transmitted from the base station controlling apparatus 600.

The controller 704 is explained in more detail. The controller 704 measures the reception quality of the received signal inputted from the received signal processing section 703, and controls the transmission power to the mobile communication terminal. And also the controller 704 controls the transmission and the reception of its own base station 700 based on a control signal received from the base station controlling apparatus 600. Further, the controller 704 receives a control signal for changing over to the different frequency from the base station controlling apparatus 600, and inputs the control signal changing over to the different frequency using at the transmission or the reception to the high frequency signal processing section 702.

Moreover, the controller 704 receives the control signal for changing over to the different frequency from the base station controlling apparatus 600, and inputs a control signal for making the data vacant time of the individual channel to the high frequency processing section 702. And also the controller 704 receives a control signal for measuring the transmission power of its own base station 700 from the base station controlling apparatus 600, and measures the transmission power of the base station 700 and controls the transmission power to the mobile communication terminal. And the controller 704 transmits the measured transmission power of its own base station 700 to the base station controlling apparatus 600.

Figure 6:
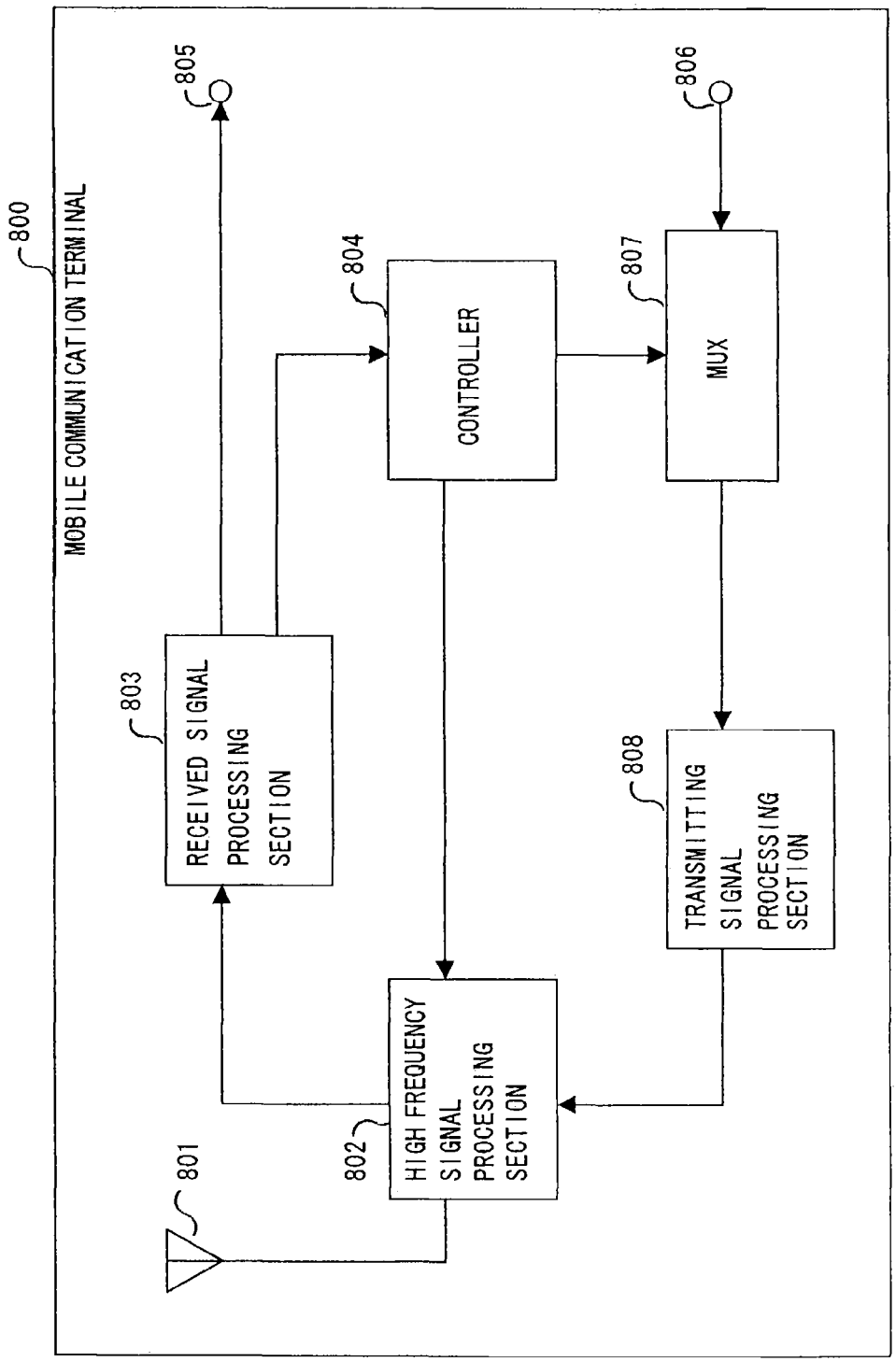
FIG. 6 is a block diagram showing the structure of a mobile communication terminal at the first embodiment of the present invention.

FIG. 6 is a block diagram showing the structure of a mobile communication terminal at the first embodiment of the present invention. Referring to FIG. 6, the mobile communication terminal at the first embodiment of the present invention is explained.

As shown in FIG. 6, a mobile communication terminal 800 provides an antenna 801, a high frequency signal processing section 802, a received signal processing section 803, a controller 804, an output terminal 805, an input terminal 806, an MUX 807, and a transmitting signal processing section 808. In FIG. 6, the new reference number 800 is attached to the mobile communication terminal, instead of the reference number 30, 31, or 32 in FIG. 1, however the functions of the mobile communication terminal are the same in FIGS. 1 and 6.

At the antenna 801, signals from one or plural base stations are received, and also from the antenna 801, signals are transmitted to the one or plural base stations. The high frequency signal processing section 802 processes received high frequency signals and transmitting high frequency signals. The received signal processing section 803 processes received signals. From the output terminal 805, received signals processed at the received signal processing section 803 are outputted. From the input terminal 806, transmitting data are inputted. The controller 804 executes control by using control signals from the received signal processing section 803. The MUX 807 multiplexes the transmitting data and control signals from the controller 804. The transmitting signal processing section 808 processes the data multiplexed at the MUX 807.

The controller 804 is explained in more detail. The controller 804 cyclically measures the broadcast channel transmitted from the base station 700, which was inputted from the received signal processing section 803, and processes information of the measured result for transmitting the information to the base station controlling apparatus 600 shown in FIG. 4. And the controller 804 measures the reception quality of the signals received at the received signal processing section 803, and generates control signals of the transmission power of one or plural base stations and outputs the control signals to the high frequency signal processing section 802. And the controller 804 controls the transmission power based on the information received from the one or plural base stations.

Figure 7:
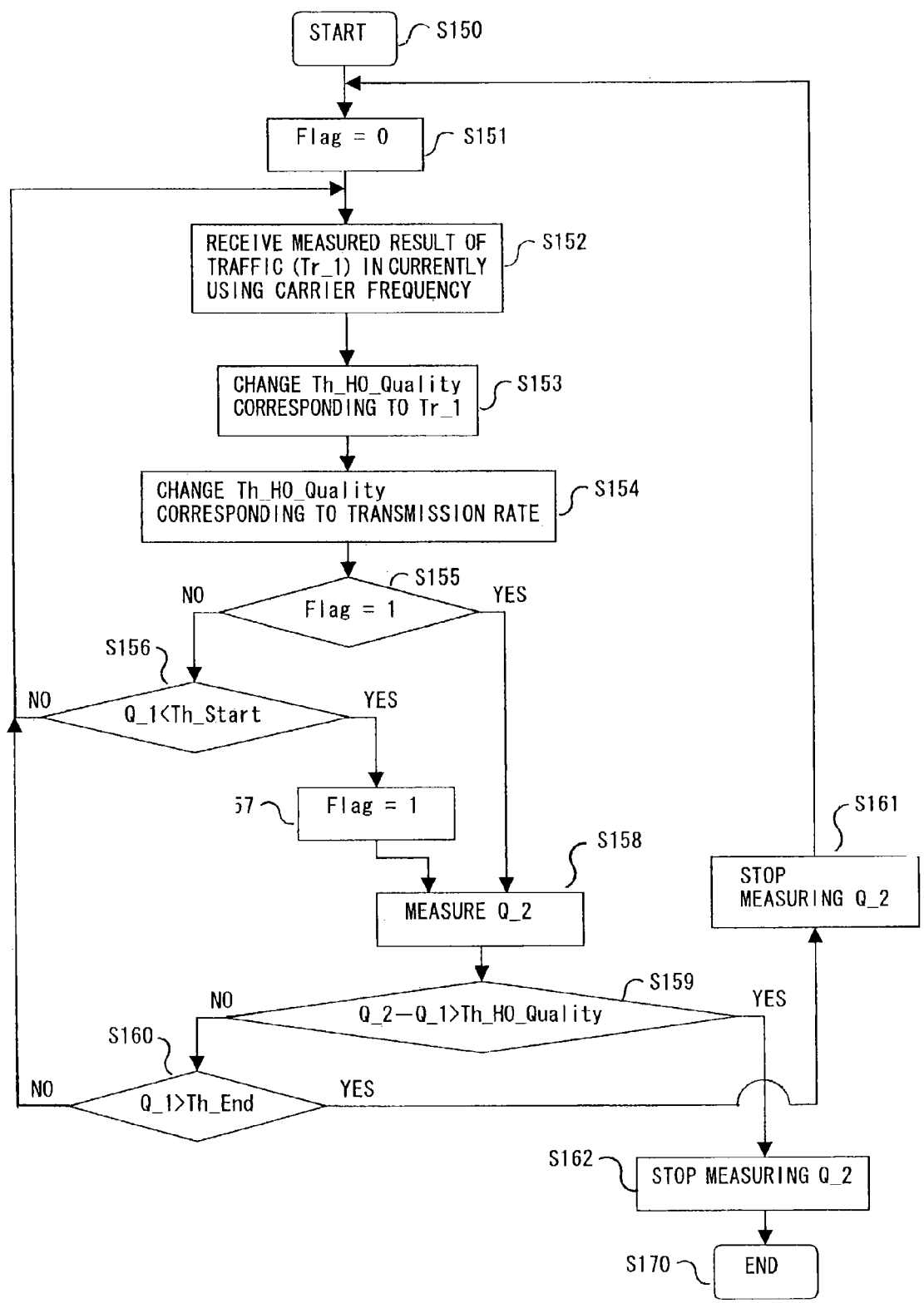
FIG. 7 is a flowchart showing the operation at a controller for changing over to different frequency in the base station controlling apparatus at the first embodiment of the present invention.

Next, the operation at a method for changing over to the different frequency at the first embodiment of the present invention is explained. The operation at the method for changing over to the different frequency at the first embodiment of the present invention is mainly executed at the controller for changing over to different frequency 606 shown in FIG. 4. FIG. 7 is a flowchart showing the operation at the controller for changing over to different frequency 606 at the first embodiment of the present invention.

Referring to FIG. 7, the operation at the controller for changing over to different frequency 606 at the first embodiment of the present invention is explained.

First, the control of changing over to a different frequency at the controller for changing over to different frequency 606 is started (step S150). That is, the step S150 shows the starting time of the control of changing over to a different frequency. Next, Flag=0, which signifies that the measurement of the different frequency is in the OFF mode, is set (step S151). In this, Flag=1 signifies that the measurement of the different frequency is in the ON mode. And the measured result of the traffic (Tr_1) in the currently using carrier frequency is received (step S152). And the judging threshold value Th_HO_Quality in the inequality (2) is changed corresponding to the Tr_1 (step S153). In this, the inequality (2): Q_2−Q_1>Th_HO_Quality.

At the actual changing of the judging threshold value Th_HO_Quality at the step S153, when the traffic (Tr_1) in the currently using carrier frequency is high, the judging threshold value Th_HO_Quality is made to be a small value, with this, the probability changing over to the different frequency is made to be high. And when the traffic (Tr_1) in the currently using carrier frequency is low, the judging threshold value Th_HO_Quality is made to be a large value, with this, the probability changing over to the different frequency is made to be low.

Next, the judging threshold value Th_HO_Quality in the inequality (2) is changed corresponding to the transmission rate (step S154). At the actual changing of the judging threshold value Th_HO_Quality at the step S154, when the transmission rate in the mobile communication terminal is high, the judging threshold value Th_HO_Quality is made to be a small value, with this, the probability changing over to the different frequency is made to be high. And when the transmission rate in the mobile communication terminal is low, the judging threshold value Th_HO_Quality is made to be a large value, with this, the probability changing over to the different frequency is made to be low.

Next, the flag value (Flag) signifying the ON or OFF mode of the measurement of the different frequency is judged (step S155). That is, that Flag=1 or not is judged at the step S155. When that the Flag=0 was judged at the step S155 (NO at the step S155), that is, it was judged that the measurement of the different frequency was in the OFF mode, it is judged whether the inequality (4) signifying the starting condition of the measurement of the different frequency is satisfied or not, by using the measured result of the reception quality Q_1 in the currently using carrier frequency (step S156). In this, the inequality (4): Q_1<Th_Start. When the condition at the step S156 was not satisfied (NO at the step S156), the operation returns to the step S152.

When the condition at the step S156 was satisfied (YES at the step S156), the flag is set to be "1" (Flag=1) (step S157), and the controller for changing over to different frequency 606 instructs the mobile communication terminal to measure the reception quality Q_2 in the different frequency to which the currently using carrier frequency is changed over (step S158).

When the condition at the step S155 was satisfied (YES at the step S155), that is, it was judged that Flag=1, the controller for changing over to different frequency 606 instructs the mobile communication terminal to measure the reception quality Q_2 in the different frequency to which the currently using carrier frequency is changed over (the step S158).

Next, the inequality (2) is judged (step S159). When the inequality (2) was not satisfied (NO at the step S159), the inequality (5) is judged (step S160). The inequality (5): Q1>Th_End, the ending condition of the measurement of the different frequency. When the condition at the step S160 was not satisfied (NO at the step S160), the operation returns to the step S152.

When the condition at the step S160 was satisfied (YES at the step S160), the controller for changing over to different frequency 606 instructs the mobile communication terminal to stop measuring the reception quality Q_2 in the different frequency to which the currently using carrier frequency is changed over (step S161). And the operation returns to the step S151.

When the condition at the step S159 was satisfied (YES at the step S159), the controller for changing over to different frequency 606 instructs the mobile communication terminal to stop measuring the reception quality Q_2 in the different frequency to which the currently using carrier frequency is changed over (step S162). And the control changing over to the different frequency is started (step S170).

At the operation mentioned above, when the traffic in the currently using carrier frequency is low at the step S152, it is possible that the measurement of the different frequency is not executed. This operation is equivalent to that the judging threshold value Th_HO_Quality is made to be +∞ at the step S153. When this operation is executed, the step S154 is skipped.

As mentioned above, according to the first embodiment of the present invention, as shown at the step S153 in FIG. 7, the judging threshold value Th_HO_Quality in the inequality (2) is changed corresponding to the traffic in the currently using carrier frequency. When the traffic in the currently using carrier frequency is high, the judging threshold value Th_HO_Quality is made to be a small value, with this, the probability changing over to the different frequency is made to be high. Therefore, the probability generating a call drop can be made to be low. And when the traffic in the currently using carrier frequency is low, the judging threshold value Th_HO_Quality is made to be a large value, with this, the probability changing over to the different frequency is made to be low. Therefore, the load for controlling the changing over to the different frequency can be decreased.

And as mentioned above, according to the first embodiment of the present invention, as shown at the step S154 in FIG. 7, the judging threshold value Th_HO_Quality in the inequality (2) is changed corresponding to the transmission rate in the mobile communication terminal. In plural mobile communication terminals connecting to a carrier frequency, the higher the transmission rate in a mobile communication terminal is, the larger the occupying band the mobile communication terminal has, therefore, the probability generating a call drop becomes high. In this case, the judging threshold value Th_HO_Quality is made to be a small value, and the probability changing over to the different frequency is made to be high. With this, the probability generating the call drop can be made to be low. And in plural mobile communication terminals connecting to a carrier frequency, the lower the transmission rate in a mobile communication terminal is, the smaller the occupying band the mobile communication terminal has, therefore, the probability generating a call drop becomes low, compared with the mobile communication terminal in which the transmission rate is high. In this case, the judging threshold value Th_HO_Quality is made to be a large value, and the probability changing over to the different frequency is made to be low. With this, the load for controlling the changing over to the different frequency can be decreased.

At the first embodiment of the present invention, at the step S152, the measured result of the traffic (Tr_1) was received, and at the step S153, the judging threshold value Th_HO_Quality was changed corresponding to the traffic (Tr_1), and after this, at the step S154, further, the judging threshold value Th_HO_Quality was changed corresponding to the transmission rate. However, at the actual operation for changing over to the different frequency, after the step S152, only the one step, that is, either the step S153 or the step S154 can be used. That is, when the step S153 is used, the step S154 is skipped, and when the step S154 is used, the step S153 is not used.

Next, the operation at a method for changing over to the different frequency at a second embodiment of the present invention is explained. The base station controlling apparatus 600 shown in FIG. 4, the base station 700 shown in FIG. 5, and the mobile communication terminal 800 shown in FIG. 6 used at the first embodiment of the present invention are also used at the second embodiment of the present invention.

Figure 8:
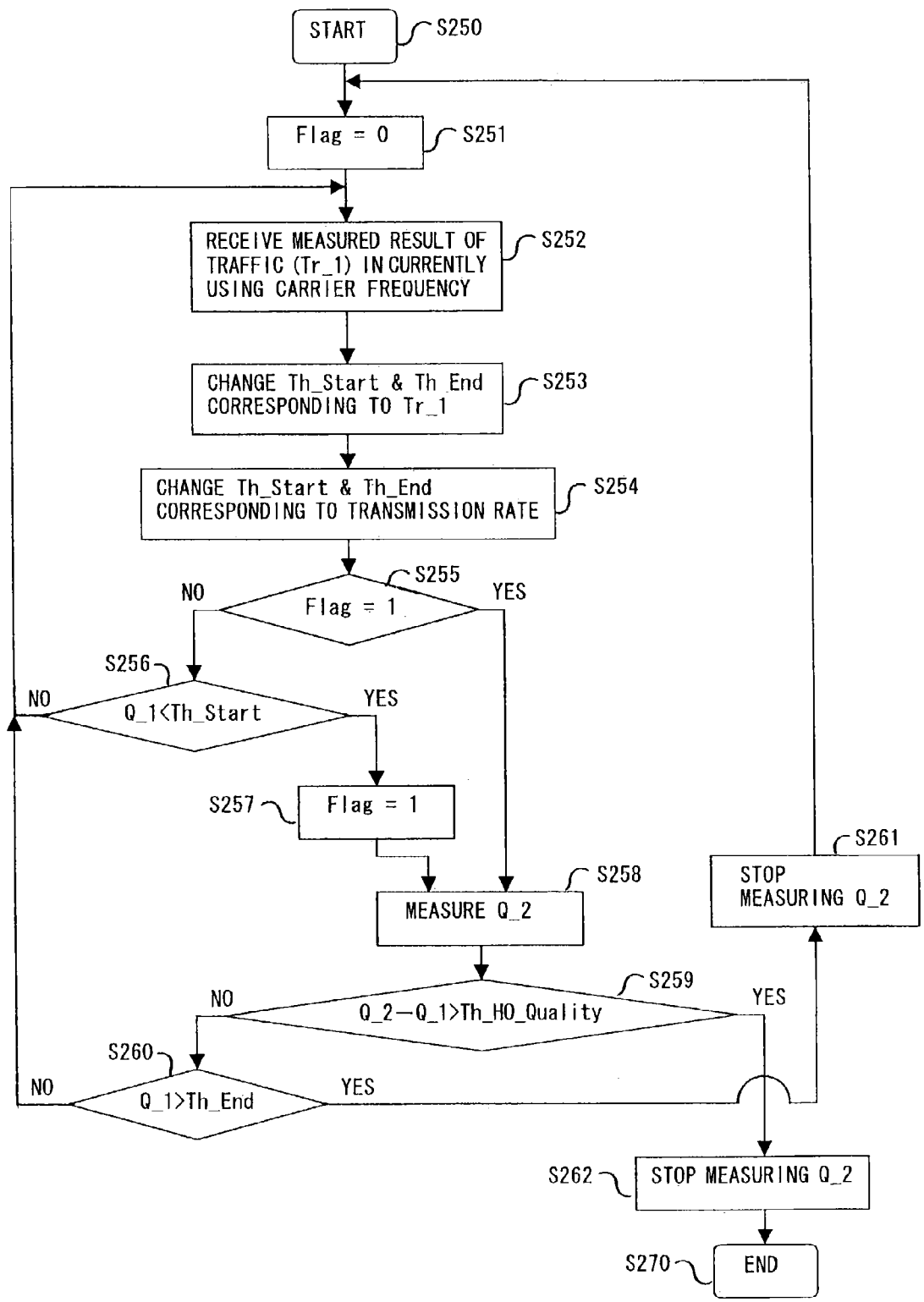
FIG. 8 is a flowchart showing the operation at the controller for changing over to different frequency in the base station controlling apparatus at a second embodiment of the present invention.

The operation at the method for changing over to the different frequency at the second embodiment of the present invention is also mainly executed at the controller for changing over to different frequency 606 shown in FIG. 4. FIG. 8 is a flowchart showing the operation at the controller for changing over to different frequency 606 at the second embodiment of the present invention.

Referring to FIG. 8, the operation at the controller for changing over to different frequency 606 at the second embodiment of the present invention is explained.

First, the control of changing over to a different frequency at the controller for changing over to different frequency 606 is started (step S250). That is, the step S250 shows the starting time of the control of changing over to a different frequency. Next, Flag=0, which signifies that the measurement of the different frequency is in the OFF mode, is set (step S251). In this, Flag=1 signifies that the measurement of the different frequency is in the ON mode. And the measured result of the traffic (Tr_1) in the currently using carrier frequency is received (step S252). And the judging threshold value Th_Start in the inequality (4) and the judging threshold value Th_End in the inequality (5) are changed corresponding to the Tr_1 (step S253). In this, the inequality (4):—Q_1<Th_Start, and the inequality (5): Q_1>Th_End.

As mentioned before, the waveforms of the reception quality Q_1 and Q_2 in the passage of time, and the relation between the judging threshold values Th_Start and Th_End and the reception quality Q_1 and Q_2 are shown in FIG. 3.

At the actual changing of the judging threshold values Th_Start and Th_End at the step S253, when the traffic (Tr_1) in the currently using carrier frequency is high, the judging threshold values Th_Start and Th_End are made to be small values, with this, the probability changing over to the different frequency is made to be high. And when the traffic (Tr_1) in the currently using carrier frequency is low, the judging threshold values Th_Start and Th_End are made to be large values, with this, the probability changing over to the different frequency is made to be low. In this, the judging threshold values Th_Start and Th_End satisfy the inequality (6): Th_End−Th_Start>0.

Next, the judging threshold value Th_Start in the inequality (4) and the judging threshold value Th_End in the inequality (5) are changed corresponding to the transmission rate (step S254). At the actual changing of the judging threshold values Th_Start and Th_End at the step S254, when the transmission rate in the mobile communication terminal is high, the judging threshold values Th_Start and Th_End are made to be small values, with this, the probability changing over to the different frequency is made to be high. And when the transmission rate in the mobile communication terminal is low, the judging threshold values Th_Start and Th_End are made to be large values, with this, the probability changing over to the different frequency is made to be low. In this, the judging threshold values Th_Start and Th_End satisfy the inequality (6): Th_End−Th_Start>0.

Next, the flag value (Flag) signifying the ON or OFF mode of the measurement of the different frequency is judged (step S255). That is, that Flag=1 or not is judged at the step S255. When that the Flag=0 was judged at the step S255 (NO at the step S255), that is, it was judged that the measurement of the different frequency was in the OFF mode, it is judged whether the inequality (4) signifying the starting condition of the measurement of the different frequency is satisfied or not, by using the measured result of the reception quality Q_1 in the currently using carrier frequency (step S256).

When the condition at the step S256 was not satisfied (NO at the step S256), the operation returns to the step S252. When the condition at the step S256 was satisfied (YES at the step S256), the flag is set to be "1" (Flag=1) (step S257), and the controller for changing over to different frequency 606 instructs the mobile communication terminal to measure the reception quality Q_2 in the different frequency to which the currently using carrier frequency is changed over (step S258).

When the condition at the step S255 was satisfied (YES at the step S255), that is, it was judged that Flag=1, the controller for changing over to different frequency 606 instructs the mobile communication terminal to measure the reception quality Q_2 in the different frequency to which the currently using carrier frequency is changed over (the step S258).

Next, the inequality (2) is judged (step S259). The inequality (2): Q_2−Q_1>Th_HO_Quality. When the inequality (2) was not satisfied (NO at the step S259), the inequality (5) is judged (step S260). The inequality (5): Q_1>Th_End, the ending condition of the measurement of the different frequency. When the condition at the step S260 was not satisfied (NO at the step S260), the operation returns to the step S252.

When the condition at the step S260 was satisfied. (YES at the step S260), the controller for changing over to different frequency 606 instructs the mobile communication terminal to stop measuring the reception quality Q_2 in the different frequency to which the currently using carrier frequency is changed over (step S261). And the operation returns to the step S251.

When the condition at the step S259 was satisfied (YES at the step S259), the controller for changing over to different frequency 606 instructs the mobile communication terminal to stop measuring the reception quality Q_2 in the different frequency to which the currently using carrier frequency is changed over (step S262). And the control changing over to the different frequency is started (step S270).

At the operation mentioned above, when the traffic in the currently using carrier frequency is low at the step S252, it is possible that the measurement of the different frequency is not executed. This operation is equivalent to that the judging threshold value Th_Start in the inequality (4) and the judging threshold value Th_End in the inequality (5) are made to be −∞ at the step S253. When this operation is executed, the step S254 is skipped.

As mentioned above, according to the second embodiment of the present invention, as shown at the step S253 in FIG. 8, the judging threshold value Th_Start in the inequality (4) and the judging threshold value Th_End in the inequality (5) are changed corresponding to the traffic in the currently using carrier frequency. When the traffic in the currently using carrier frequency is high, the judging threshold value Th_Start in the inequality (4) and the judging threshold value Th_End in the inequality (5) are made to be small values, with this, the probability changing over to the different frequency is made to be high. Therefore, the probability generating the call drop can be made to be low. And when the traffic in the currently using carrier frequency is low, the judging threshold value Th_Start in the inequality (4) and the judging threshold value Th_End in the inequality (5) are made to be large values, with this, the probability changing over to the different frequency is made to be low. Therefore, the load for controlling the changing over to the different frequency can be decreased.

And as mentioned above, according to the second embodiment of the present invention, as shown at the step S254 in FIG. 8, the judging threshold value Th_Start in the inequality (4) and the judging threshold value Th_End in the inequality (5) are changed corresponding to the transmission rate in the mobile communication terminal. In plural mobile communication terminals connecting to a carrier frequency, the higher the transmission rate in a mobile communication terminal is, the larger the occupying band the mobile communication terminal has, therefore, the probability generating a call drop becomes high. In this case, the judging threshold value Th_Start in the inequality (4) and the judging threshold value Th_End in the inequality (5) are made to be small values, and the probability changing over to the different frequency is made to be high. With this, the probability generating the call drop can be made to be low. And in plural mobile communication terminals connecting to a carrier frequency, the lower the transmission rate in a mobile communication terminal is, the smaller the occupying band the mobile communication terminal has, therefore, the probability generating a call drop becomes low, compared with the mobile communication terminal in which the transmission rate is high. In this case, the judging threshold value Th_Start in the inequality (4) and the judging threshold value Th_End in the inequality (5) are made to be large values, and the probability changing over to the different frequency is made to be low. With this, the load for controlling the changing over to the different frequency can be decreased.

At the second embodiment of the present invention, at the step S252, the measured result of the traffic (Tr_1) was received, and at the step S253, the judging threshold values Th_Start and Th_End were changed corresponding to the traffic (Tr_1), and after this, at the step S254, further, the judging threshold values Th_Start and Th_End were changed corresponding to the transmission rate. However, at the actual operation for changing over to the different frequency, after the step S252, only the one step, that is, either the step S253 or the step S254 can be used. That is, when the step S253 is used, the step S254 is skipped, and when the step S254 is used, the step S253 is not used.

Next, the operation at a method for changing over to the different frequency at a third embodiment of the present invention is explained. The base station controlling apparatus 600 shown in FIG. 4, the base station 700 shown in FIG. 5, and the mobile communication terminal 800 shown in FIG. 6 used at the first embodiment of the present invention are also used at the third embodiment of the present invention.

The operation at the method for changing over to the different frequency at the third embodiment of the present invention is also mainly executed at the controller for changing over to different frequency 606 shown in FIG. 4.

Figure 9:
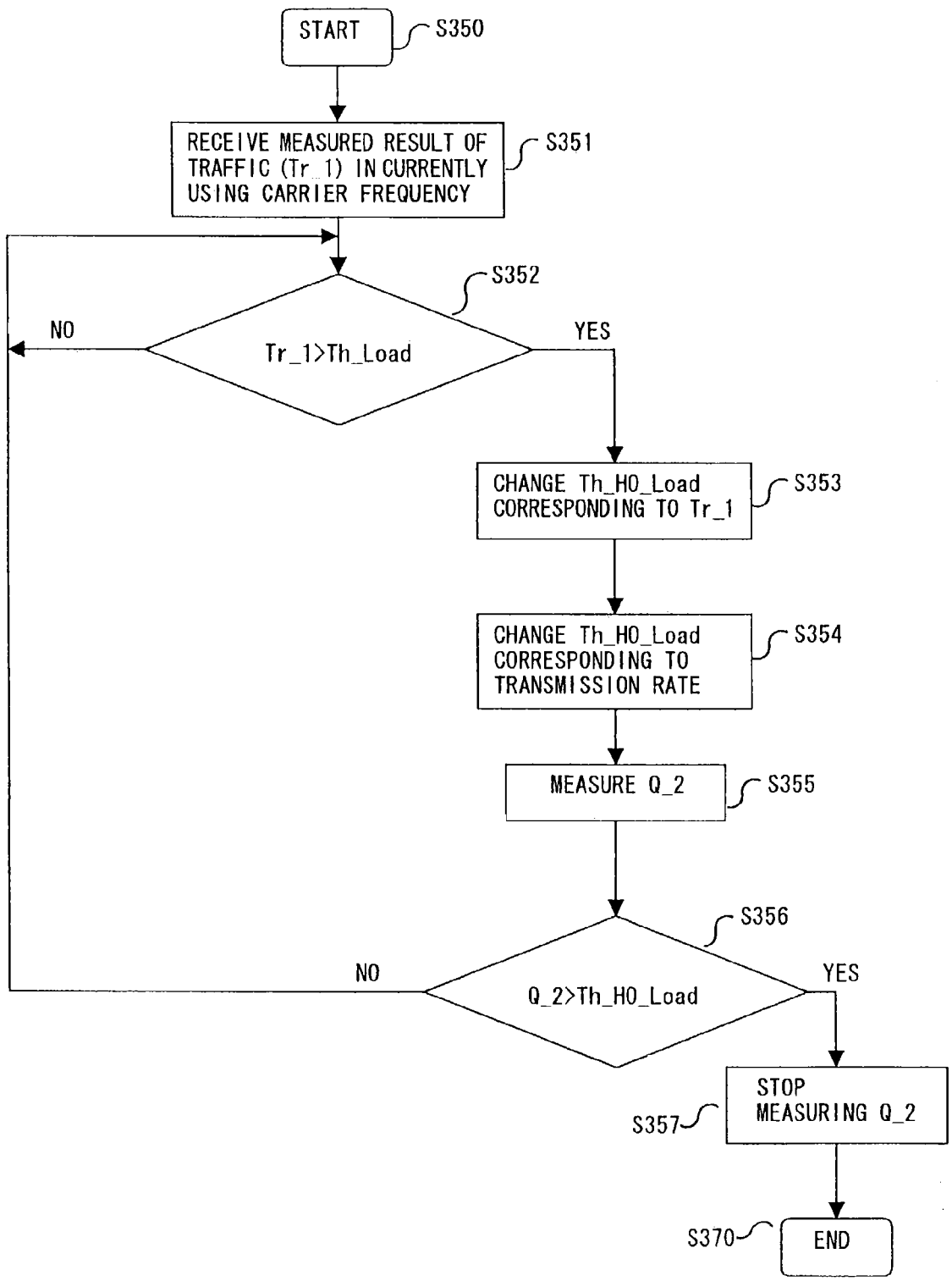
FIG. 9 is a flowchart showing the operation at the controller for changing over to different frequency in the base station controlling apparatus at a third embodiment of the present invention.

FIG. 9 is a flowchart showing the operation at the controller for changing over to different frequency 606 at the third embodiment of the present invention.

Referring to FIG. 9, the operation at the controller for changing over to different frequency 606 at the third embodiment of the present invention is explained.

First, the control of changing over to a different frequency at the controller for changing over to different frequency 606 is started (step S350). That is, the step S350 shows the starting time of the control of changing over to a different frequency. Next, the measured result of the traffic (Tr_1) in the currently using carrier frequency is received (step S351). And it is judged whether the traffic (Tr_1) exceeds the judging threshold value Th_Load or not (step S352). As mentioned above, when the traffic (Tr_1) in the currently using carrier frequency exceeded the judging threshold value Th_Load, the actual operation changing over to the different frequency is started.

When it was judged that the traffic (Tr_1) did not exceed the judging threshold value Th_Load (NO at the step S352), the operation returns to the step S351. When it was judged that the traffic (Tr_1) exceeded the judging threshold value Th_Load (YES at the step S352), the judging threshold value Th_HO_Load in the inequality (3) is changed corresponding to the traffic (Tr_1) (step S353). In this, the inequality (3): Q_2>Th_HO_Load.

At the actual changing of the judging threshold value Th_HO_Load at the step S353, in case that the traffic (Tr_1) in the currently using carrier frequency is high, the judging threshold value Th_HO_Load is made to a small value, and the probability for changing over to the different frequency is made to be high. And in case that the traffic (Tr_1) in the currently using carrier frequency is low, the judging threshold value Th_HO_Load is made to be a large value, and the probability for changing over to the different frequency is made to be low.

Next, the value of the judging threshold value Th_HO_Load in the inequality (3) is changed corresponding to the transmission rate in the mobile communication terminal (step S354). At the actual changing of the judging threshold value Th_HO_Load at the step S354, in case that the transmission rate in the mobile communication terminal is high, the judging threshold value Th_HO_Load is made to a small value, and the probability for changing over to the different frequency is made to be high. And in case that the transmission rate in the mobile communication terminal is low, the judging threshold value Th_HO_Load is made to be a large value, and the probability for changing over to the different frequency is made to be low.

After the step S354, the controller for changing over to different frequency 606 instructs the mobile communication terminal to measure the reception quality Q_2 in the different frequency to which the currently using carrier frequency is changed over (step S355). And the condition of the inequality (3) is judged (step S356). When the condition in the inequality (3) was not satisfied (NO at the step S356), the operation returns to the step S351. When the condition in the inequality (3) was satisfied (YES at the step S356), the controller for changing over to different frequency 606 instructs the mobile communication terminal to stop measuring the reception quality Q_2 in the different frequency to which the currently using carrier frequency is changed over (step S357). And after this, the controller for changing over to different frequency 606 starts changing to the different frequency (step S370).

As mentioned above, according to the third embodiment of the present invention, as shown at the step S353 in FIG. 9, the judging threshold value Th_HO_Load in the inequality (3) is changed corresponding to the traffic in the currently using carrier frequency. In the actual changing of the judging threshold value Th_HO_Load, when the traffic in the currently using carrier frequency is high, the judging threshold value Th_HO_Load in the inequality (3) is made to be a small value, with this, the probability changing over to the different frequency is made to be high. Therefore, the probability generating the call drop can be made to be low. And when the traffic in the currently using carrier frequency is low, the judging threshold value Th_HO_Load in the inequality (3) is made to be a large value, with this, the probability changing over to the different frequency is made to be low. Therefore, the load for controlling the changing over to the different frequency can be decreased.

And as mentioned above, according to the third embodiment of the present invention, as shown at the step S354 in FIG. 9, the judging threshold value Th_HO_Load in the inequality (3) is changed corresponding to the transmission rate in the mobile communication terminal. In plural mobile communication terminals connecting to a carrier frequency, the higher the transmission rate in a mobile communication terminal is, the larger the occupying band the mobile communication terminal has, therefore, the probability generating a call drop becomes high. In this case, the judging threshold value Th_HO_Load in the inequality (3) is made to be a small value, and the probability changing over to the different frequency is made to be high. With this, the probability generating the call drop can be made to be low. And in plural mobile communication terminals connecting to a carrier frequency, the lower the transmission rate in a mobile communication terminal is, the smaller the occupying band the mobile communication terminal has, therefore, the probability generating the call drop becomes low, compared with the mobile communication terminal in which the transmission rate is high. In this case, the judging threshold value Th_HO_Load in the inequality (3) is made to be a large value, and the probability changing over to the different frequency is made to be low. With this, the load for controlling the changing over to the different frequency can be decreased.

At the third embodiment of the present invention, at the step S352, it was judged whether the traffic (Tr_1) in the currently using carrier frequency exceeded the judging threshold value Th_Load or not. And when the traffic (Tr_1) exceeded the judging threshold value Th_Load, at the step S353, the judging threshold value Th_HO_Load was changed corresponding to the traffic (Tr_1), and after this, at the step S354, further, the judging threshold value Th_HO_Load was changed corresponding to the transmission rate. However, at the actual operation for changing over to the different frequency, after the step S352, only the one step, that is, either the step S353 or the step S354 can be used. That is, when the step S353 is used, the step S354 is skipped, and when the step S354 is used, the step S353 is not used.

Next, the effects of the present invention are explained. As mentioned above, according to the first embodiment of the present invention, a judging threshold value (Th_HO_Quality) (third threshold value) using in the changing over to the different frequency is changed corresponding to the traffic in the currently using carrier frequency. In case that the traffic in the currently using carrier frequency is high, that is, the probability generating a call drop is high, the judging threshold value is made to be a small value, and the number of times of changing over to the different frequency is made to be large. With this, the probability generating the call drop can be made to be low. And in case that the traffic in the currently using carrier frequency is low, that is, the probability generating the call drop is low, the judging threshold value is made to be a large value, and the number of times of changing over to the different frequency is made to be small. With this, the load for controlling the changing over to the different frequency can be decreased.

And according to the first embodiment of the present invention, the judging threshold value (Th_HO_Quality) using in the changing over to the different frequency is changed corresponding to the transmission rate in the mobile communication terminal. In case that the transmission rate is high, that is, the probability generating a call drop is high, the judging threshold value is made to be a small value, and the number of times of changing over to the different frequency is made to be large. With this, the probability generating the call drop can be made to be low. And in case that the transmission rate is low, that is, the probability generating the call drop is low, the judging threshold value is made to be a large value, and the number of times of changing over to the different frequency is made to be small.

With this, the load for controlling the changing over to the different frequency can be decreased.

And according to the second embodiment of the present invention, a judging threshold value (Th_Start) (first threshold value) and a judging threshold value (Th_End) (second threshold value) using in the changing over to the different frequency are changed corresponding to the traffic in the currently using carrier frequency. In case that the traffic in the currently using carrier frequency is high, that is, the probability generating a call drop is high, the judging threshold values are made to be small values, and the number of times of changing over to the different frequency is made to be large. With this, the probability generating the call drop can be made to be low. And in case that the traffic in the currently using carrier frequency is low, that is, the probability generating a call drop is low, the judging threshold values are made to be large values, and the number of times of changing over to the different frequency is made to be small. With this, the load for controlling the changing over to the different frequency can be decreased.

And according to the second embodiment of the present invention, the judging threshold values using in the changing over to the different frequency are changed corresponding to the transmission rate in the mobile communication terminal. In case that the transmission rate is high, that is, the probability generating a call drop is high, the judging threshold values are made to be small values, and the number of times of changing over to the different frequency is made to be large. With this, the probability generating the call drop can be made to be low. And in case that the transmission rate is low, that is, the probability generating the call drop is low, the judging threshold values are made to be large values, and the number of times of changing over to the different frequency is made to be small. With this, the load for controlling the changing over to the different frequency can be decreased.

And according to the third embodiment of the present invention, a judging threshold value (Th_HO_Load) (fourth threshold value) using in the changing over to the different frequency is changed corresponding to the traffic in the currently using carrier frequency. In case that the traffic in the currently using carrier frequency is high, that is, the probability generating a call drop is high, the judging threshold value is made to be a small value, and the number of times of changing over to the different frequency is made to be large. With this, the probability generating the call drop can be made to be low. And in case that the traffic in the currently using carrier frequency is low, that is, the probability generating the call drops is low, the judging threshold value is made to be a large value, and the number of times of changing over to the different frequency is made to be small. With this, the load for controlling the changing over to the different frequency can be decreased.

And according to the third embodiment of the present invention, the judging threshold value using in the changing over to the different frequency is changed corresponding to the transmission rate in the mobile communication terminal. In case that the transmission rate in the mobile communication terminal is high, that is, the probability generating a call drop is high, the judging threshold value is made to be a small value, and the number of times of changing over to the different frequency is made to be large. With this, the probability generating the call drop can be made to be low. And in case that the transmission rate in the mobile communication terminal is low, that is, the probability generating the call drop is low, the judging threshold value is made to be a large value, and the number of times of changing over to the different frequency is made to be small. With this, the load for controlling the changing over to the different frequency can be decreased.

As mentioned above, according to the embodiments of the present invention, the load for controlling the changing over to the different frequency is decreased corresponding to the traffic and the transmission rate. Therefore, the unnecessary amount of control can be decreased and also the probability generating the call drop can be decreased.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A method for changing over to a different frequency at a cellular phone system, in which a mobile communication terminal, a first base station and a second base station, and a base station controlling apparatus are provided, wherein:

said first base station communicates with said mobile communication terminal by setting a channel using a first frequency, and said second base station communicates with said mobile communication terminal by setting a channel using a second frequency, and said mobile communication terminal is controlled to measure first reception quality in said first frequency during the communication with said first base station by setting a channel, and also said mobile communication terminal is controlled to measure second reception quality in said second frequency corresponding to said first reception quality during the communication with said first base station by setting the channel, and said mobile communication terminal is controlled to communicate with said second base station by changing over the channel from said first base station to said second base station corresponding to said first and second reception quality, wherein:

said method for changing over to a different frequency, comprising the step of:

changing the condition of measuring said second reception quality corresponding to the traffic in said first frequency by said base station controlling apparatus.

2. A method for changing over to a different frequency in accordance with claim 1, further comprising the steps of:

changing first and second threshold values corresponding to said traffic in said first frequency by said base station controlling apparatus; and instructing said mobile communication terminal to measure said second reception quality by said base station controlling apparatus, when said first reception quality is less than said first threshold value.

3. A method for changing over to a different frequency at a cellular phone system, in which a mobile communication terminal, a first base station and a second base station, and a base station controlling apparatus are provided, wherein:

said first base station communicates with said mobile communication terminal by setting a channel using a first frequency, and said second base station communicates with said mobile communication terminal by setting a channel using a second frequency, and said mobile communication terminal is controlled to measure first reception quality in said first frequency and second reception quality in said second frequency during the communication with said first base station by setting a channel, and said mobile communication terminal is controlled to communicate with said second base station by changing over the channel from said first base station to said second base station when the difference between said second reception quality and said first reception quality exceeded a third threshold value, wherein:

said method for changing over to a different frequency, comprising the steps of:

measuring the traffic in said first frequency by said base station controlling apparatus; and changing said third threshold value corresponding to said measured traffic by said base station controlling apparatus.

4. A method for changing over to a different frequency in accordance with claim 1, further comprising the step of:

controlling said mobile communication terminal not to measure said second reception quality by said base station controlling apparatus in case that said traffic is less than a specific value.

5. A method for changing over to a different frequency at a cellular phone system, in which a mobile communication terminal, a first base station and a second base station, and a base station controlling apparatus are provided, wherein:

said first base station communicates with said mobile communication terminal by setting a channel using a first frequency, and said second base station communicates with said mobile communication terminal by setting a channel using a second frequency, and said mobile communication terminal is controlled to measure second reception quality in said second frequency during the communication with said first base station by setting a channel, and said mobile communication terminal is controlled to communicate with said second base station by changing over the channel from said first base station to said second base station when said second reception quality exceeded a fourth threshold value, wherein:

said method for changing over to a different frequency, comprising the steps of:

measuring the traffic in said first frequency by said base station controlling apparatus; and changing said fourth threshold value corresponding to said measured traffic by said base station controlling apparatus.

6. A method for changing over to a different frequency in accordance with claim 5, further comprising the step of:

controlling said mobile communication terminal to communicate with said second base station by changing over the channel from said first base station to said second base station in case that said measured traffic exceeded a designated threshold value by said base station controlling apparatus.

7. A method for changing over to a different frequency at a cellular phone system, in which a mobile communication terminal, a first base station and a second base station, and a base station controlling apparatus are provided, wherein:

said first base station communicates with said mobile communication terminal by setting a channel using a first frequency, and said second base station communicates with said mobile communication terminal by setting a channel using a second frequency, and said mobile communication terminal is controlled to measure first reception quality in said first frequency during the communication with said first base station by setting a channel, and also said mobile communication terminal is controlled to measure second reception quality in said second frequency corresponding to said first reception quality during the communication with said first base station by setting the channel, and said mobile communication terminal is controlled to communicate with said second base station by changing over the channel from said first base station to said second base station corresponding to said first and second reception quality, wherein:

said method for changing over to a different frequency, comprising the step of:

changing the condition of measuring said second reception quality corresponding to the transmission rate in said mobile communication terminal by said base station controlling apparatus.

8. A method for changing over to a different frequency in accordance with claim 7, further comprising the steps of:

changing first and second threshold values corresponding to said transmission rate in said mobile communication terminal by said base station controlling apparatus; and instructing said mobile communication terminal to measure said second reception quality by said base station controlling apparatus, when said first reception quality is less than said first threshold value.

9. A method for changing over to a different frequency at a cellular phone system, in which a mobile communication terminal, a first base station and a second base station, and a base station controlling apparatus are provided, wherein:

said first base station communicates with said mobile communication terminal by setting a channel using a first frequency, and said second base station communicates with said mobile communication terminal by setting a channel using a second frequency, and said mobile communication terminal is controlled to measure first reception quality in said first frequency and second reception quality in said second frequency during the communication with said first base station by setting a channel, and said mobile communication terminal is controlled to communicate with said second base station by changing over the channel from said first base station to said second base station when the difference between said second reception quality and said first reception quality exceeded a third threshold value, wherein:

said method for changing over to a different frequency, comprising the step of:

changing said third threshold value corresponding to said transmission rate in said mobile communication terminal by said base station controlling apparatus.

10. A method for changing over to a different frequency at a cellular phone system, in which a mobile communication terminal, a first base station and a second base station, and a base station controlling apparatus are provided, wherein:

said first base station communicates with said mobile communication terminal by setting a channel using a first frequency, and said second base station communicates with said mobile communication terminal by setting a channel using a second frequency, and said mobile communication terminal is controlled to measure second reception quality in said second frequency during the communication with said first base station by setting a channel, and said mobile communication terminal is controlled to communicate with said second base station by changing over the channel from said first base station to said second base station when said second reception quality exceeded a fourth threshold value, wherein:

said method for changing over to a different frequency, comprising the step of:

changing said fourth threshold value corresponding to said transmission rate in said mobile communication terminal by said base station controlling apparatus.

11. A method for changing over to a different frequency in accordance with claim 1, wherein:

said first base station transmits a first broadcast channel and said second base station transmits a second broadcast channel, and said first reception quality is reception quality in said first broadcast channel and said second reception quality is reception quality in said second broadcast channel.

12. A method for changing over to a different frequency in accordance with claim 1, further comprising the steps of:

making a data vacant time in which data are not transmitted by compressing transmitting data in the time by said first base station; and measuring said second reception quality in said data vacant time by said mobile communication terminal.

13. A cellular phone system, in which a mobile communication terminal, a first base station and a second base station, and a base station controlling apparatus are provided, wherein:

said first base station communicates with said mobile communication terminal by setting a channel using a first frequency, and said second base station communicates with said mobile communication terminal by setting a channel using a second frequency, and said mobile communication terminal is controlled to measure first reception quality in said first frequency during the communication with said first base station by setting a channel, and also said mobile communication terminal is controlled to measure second reception quality in said second frequency corresponding to said first reception quality during the communication with said first base station by setting the channel, and said mobile communication terminal is controlled to communicate with said second base station by changing over the channel from said first base station to said second base station corresponding to said first and second reception quality, wherein:

said base station controlling apparatus, comprising:

a condition changing means for changing the condition of measuring said second reception quality corresponding to the traffic in said first frequency.

14. A cellular phone system in accordance with claim 13, wherein:

said base station controlling apparatus, further comprising:

a first threshold value changing means for changing first and second threshold values corresponding to said traffic in said first frequency; and an instructing means for instructing said mobile communication terminal to measure said second reception quality, when said first reception quality is less than said first threshold value.

15. A cellular phone system, in which a mobile communication terminal, a first base station and a second base station, and a base station controlling apparatus are provided, wherein:

said first base station communicates with said mobile communication terminal by setting a channel using a first frequency, and said second base station communicates with said mobile communication terminal by setting a channel using a second frequency, and said mobile communication terminal is controlled to measure first reception quality in said first frequency and second reception quality in said second frequency during the communication with said first base station by setting a channel, and said mobile communication terminal is controlled to communicate with said second base station by changing over the channel from said first base station to said second base station when the difference between said second reception quality and said first reception quality exceeded a third threshold value, wherein:

said base station controlling apparatus, comprising:

a traffic measuring means for measuring the traffic in said first frequency; and a second threshold value changing means for changing said third threshold value corresponding to said measured traffic.

16. A cellular phone system in accordance with claim 13, wherein:

said base station controlling apparatus, further comprising:

a first controlling means for controlling said mobile communication terminal not to measure said second reception quality in case that said traffic is less than a specific value.

17. A cellular phone system, in which a mobile communication terminal, a first base station and a second base station, and a base station controlling apparatus are provided, wherein:

said first base station communicates with said mobile communication terminal by setting a channel using a first frequency, and said second base station communicates with said mobile communication terminal by setting a channel using a second frequency, and said mobile communication terminal is controlled to measure second reception quality in said second frequency during the communication with said first base station by setting a channel, and said mobile communication terminal is controlled to communicate with said second base station by changing over the channel from said first base station to said second base station when said second reception quality exceeded a fourth threshold value, wherein:

said base station controlling apparatus, comprising:

a traffic measuring means for measuring the traffic in said first frequency; and a third threshold value changing means for changing said fourth threshold value corresponding to said measured traffic.

18. A cellular phone system in accordance with claim 17, wherein:
said base station controlling apparatus, further comprising:
a second controlling means for controlling said mobile communication terminal to communicate with said second base station by changing over the channel from said first base station to said second base station in case that said measured traffic exceeded a designated threshold value.

19. A cellular phone system, in which a mobile communication terminal, a first base station and a second base station, and a base station controlling apparatus are provided, wherein:
said first base station communicates, with said mobile communication terminal by setting a channel using a first frequency, and
said second base station communicates with said mobile communication terminal by setting a channel using a second frequency, and
said mobile communication terminal is controlled to measure first reception quality in said first frequency during the communication with said first base station by setting a channel, and also
said mobile communication terminal is controlled to measure second reception quality in said second frequency corresponding to said first reception quality during the communication with said first base station by setting the channel, and
said mobile communication terminal is controlled to communicate with said second base station by changing over the channel from said first base station to said second base station corresponding to said first and second reception quality, wherein:
said base station controlling apparatus, comprising:
a condition changing means for changing the condition of measuring said second reception quality corresponding to the transmission rate in said mobile communication terminal.

20. A cellular phone system in accordance with claim 19, wherein:
said base station controlling apparatus, further comprising:
a first threshold value changing means for changing first and second threshold values corresponding to said transmission rate in said mobile communication terminal; and
an instructing means for instructing said mobile communication terminal to measure said second reception quality, when said first reception quality is less than said first threshold value.

21. A cellular phone system, in which a mobile communication terminal, a first base station and a second base station, and a base station controlling apparatus are provided, wherein:
said first base station communicates with said mobile communication terminal by setting a channel using a first frequency, and
said second base station communicates with said mobile communication terminal by setting a channel using a second frequency, and
said mobile communication terminal is controlled to measure first reception quality in said first frequency and second reception quality in said second frequency during the communication with said first base station by setting a channel, and
said mobile communication terminal is controlled to communicate with said second base station by changing over the channel from said first base station to said second base station when the difference between said second reception quality and said first reception quality exceeded a third threshold value, wherein:
said base station controlling apparatus, comprising:
a second threshold value changing means for changing said third threshold value corresponding to said transmission rate in said mobile communication terminal.

22. A cellular phone system, in which a mobile communication terminal, a first base station and a second base station, and a base station controlling apparatus are provided, wherein:
said first base station communicates with said mobile communication terminal by setting a channel using a first frequency, and
said second base station communicates with said mobile communication terminal by setting a channel using a second frequency, and
said mobile communication terminal is controlled to measure second reception quality in said second frequency during the communication with said first base station by setting a channel, and
said mobile communication terminal is controlled to communicate with said second base station by changing over the channel from said first base station to said second base station when said second reception quality exceeded a fourth threshold value, wherein:
said base station controlling apparatus, comprising:
a third threshold value changing means for changing said fourth threshold value corresponding to said transmission rate in said mobile communication terminal.

23. A cellular phone system in accordance with claim 13, wherein:
said first base station transmits a first broadcast channel and said second base station transmits a second broadcast channel, and
said first reception quality is reception quality in said first broadcast channel and said second reception quality is reception quality in said second broadcast channel.

24. A cellular phone system in accordance with claim 13, wherein:
said first base station, comprising:
a data vacant time making means for making a data vacant time in which data are not transmitted by compressing transmitting data in the time; and
said mobile communication terminal, comprising:
a measuring means for measuring said second reception quality in said data vacant time.

* * * * *